(12) United States Patent
Choi

(10) Patent No.: US 11,652,206 B2
(45) Date of Patent: May 16, 2023

(54) TWO DIMENSIONAL (2D) TRANSITION METAL DICHALCOGENIDE (TMD) MATERIALS AND ALLOYS AS CATALYSTS FOR CATHODE IN LITHIUM SULFUR (LI-S) BATTERIES

(71) Applicant: University of North Texas, Denton, TX (US)

(72) Inventor: Wonbong Choi, Coppell, TX (US)

(73) Assignee: University of North Texas, Denton, TX (US)

(\*) Notice: Subject to any disclaimer, the term of this patent is extended or adjusted under 35 U.S.C. 154(b) by 65 days.

(21) Appl. No.: 17/219,523

(22) Filed: Mar. 31, 2021

(65) Prior Publication Data

US 2021/0313576 A1    Oct. 7, 2021

Related U.S. Application Data

(60) Provisional application No. 63/005,177, filed on Apr. 3, 2020.

(51) Int. Cl.
| | |
|---|---|
| *H01M 4/58* | (2010.01) |
| *H01M 4/13* | (2010.01) |
| *H01M 4/04* | (2006.01) |
| *H01M 4/133* | (2010.01) |
| *H01M 4/02* | (2006.01) |

(52) U.S. Cl.
CPC ....... *H01M 4/5815* (2013.01); *H01M 4/0426* (2013.01); *H01M 4/0428* (2013.01); *H01M 4/133* (2013.01); *H01M 2004/028* (2013.01)

(58) Field of Classification Search
CPC ...... H01M 4/5815; H01M 4/58; H01M 4/133; H01M 4/0404; H01M 4/04
See application file for complete search history.

(56) References Cited

PUBLICATIONS

Wang et al., "Steam-Etched Spherical Carbon/Sulfur Composite with High Sulfur Capacity and Long Cycle Life for Li/S Battery Application", CS Appl. Mater. Interfaces 2015, 7, 6, 3590-3599, Jan. 26, 2015.*

(Continued)

*Primary Examiner* — Kenneth J Douyette
(74) *Attorney, Agent, or Firm* — Norton Rose Fulbright US LLP

(57) ABSTRACT

Two-dimensional (2D) material-based metal or alloy catalysts synthesized on carbon materials (e.g., carbon nanotubes) prevent polysulfide shuttling and overcome technical challenges for developing practical lithium-sulfur (Li—S) batteries. Soluble lithium polysulfides (LiPSs) tend to shuttle during battery cycling and corrode a Li anode, leading to eventual performance fading in the Li—S battery. This shuttle effect can be reduced by accelerating the conversion of the dissolved polysulfides to the insoluble LiPSs and back to the sulfur. A 2D material-based alloy or 2D material synthesized on carbon materials can suppress polysulfide shuttling by catalyzing polysulfide reactions. 2D material-based alloys with 2H (semiconducting)—1T (metallic) mixed phase exhibit synergistic effects of accelerated electron transfer and catalytic performance as confirmed by the lower charge-transfer resistance of carbon nanotube (CNT)—S cathode and the high binding energy of LiPSs to the catalyst.

16 Claims, 17 Drawing Sheets

(56) References Cited

PUBLICATIONS

Choi et al., "Recent development of two-dimensional transition metal dichalcogenides and their applications", Materials Today, vol. 20, Issue 3, Apr. 2017, pp. 116-130.*

Li et al., "Emerging energy applications of two-dimensional layered transition metal dichalcogenides", Nano Energy, vol. 18, Nov. 2015, pp. 293-305.*

* cited by examiner

TWO DIMENSIONAL (2D) TRANSITION METAL DICHALCOGENIDE (TMD) MATERIALS AND ALLOYS AS CATALYSTS FOR CATHODE IN LITHIUM SULFUR (LI-S) BATTERIES

CROSS-REFERENCED TO RELATED APPLICATION

The present application claims the benefit of U.S. Provisional Patent Application No. 63/005,177, filed Apr. 3, 2020 and titled "2D TMD ALLOYS AS CATALYSTS FOR CATHODE IN LI-S BATTERIES," the contents of which are incorporated herein by reference in their entirety.

TECHNICAL FIELD

The present disclosure generally relates to electrochemical energy storage systems and methods for manufacturing the same. Specifically, the present application provides for manufacturing and using two-dimensional (2D) transition metal dichalcogenides (TMDs) alloys or single metals as electrocatalysts.

BACKGROUND

There is a growing awareness that current lithium-ion battery technologies are reaching their limits in terms of storage and energy capabilities. However, there is still increasing demand for higher energy storage and longer lasting devices. For example, prevalent battery-based appliances (e.g., electric vehicles, mobile computing and telecommunications devices, aerospace transportation, specialized unmanned vehicles, etc.) require higher energy storage over conventional lithium-ion battery systems. This has challenged the research community to search for next-generation battery systems.

Lithium (Li) metal has been known as the "hostless" material to store Li ions (Li$^+$) without the need for using intercalating and/or conducting scaffold techniques. For this reason, Li metal electrodes exhibit high theoretical specific capacity (~3860 mAh g$^{-1}$) and low redox potential (-3.04 V); thus, they are often regarded as the best choice to use for manufacturing/fabricating anodes for next-generation rechargeable Li batteries. However, Li metal anodes exhibit properties that cause multiple practical issues which inhibit their use. These properties are often associated with uncontrollable dendrite formation during repeated Li deposition/dissolution processes, which can lead to short circuiting the battery and potential overheating and fire.

Among various electrochemical energy storage systems, lithium-sulfur (Li—S) batteries have potential to be a next generation rechargeable battery because of their high theoretical energy density (approximately 2600 Wh kg$^{-1}$, which is five times higher than the approximately 387 Wh kg$^{-1}$ energy density of the conventional Li-ion batteries), low cost, and the natural abundance of sulfur and other chalcogens (e.g., selenium, tellurium, etc.). An Li—S battery may include an anode, cathode, separator, electrolyte, negative terminal, positive terminal, and casing. The anode may include a Li electrode coated with at least one layer of 2D material, and the cathode may include sulfur powder as a sulfur electrode and/or a composite with carbon structure (e.g., carbon nanotubes, graphene, porous carbons, freestanding 3D CNTs, etc.). The separator may include polypropylene (PP), polyethylene (PE), or the like, and the electrolyte may include any number of electrolyte solutions (e.g., aqueous, non-aqueous, etc.) which may allow for transporting Li ions between the cathode and the anode. Example structures and operations of Li—S batteries are discussed in further detail in U.S. patent application Ser. No. 16/482,372, which is incorporated by reference herein.

Despite the potential advantages of Li—S batteries, several intrinsic issues exist that significantly affect the final performance of an Li—S battery:(1) poor cathode rechargeability and rate properties due to the electrically insulating nature of sulfur and its reaction intermediates ($Li_2S_n$, $3 \leq n \leq 6$); (2) uncontrolled solid-electrolyte interface reactions that cause unstable reactions and dendritic growth on Li-metal surfaces; and (3) inferior reaction kinetics for polysulfide conversion that results in a shuttle effect and fast capacity fading. Some methods have been explored to enhance the reaction kinetics of lithium polysulfide conversion:(1) designing hollow micro/nanostructured hosts for sulfur with controlled shape and composition; (2) surface functionalization to induce anchoring lithium polysulfides in host carbonaceous structure; and (3) introducing polar mediators such as metal oxides, sulfides, nitrides and carbides acting as polysulfide immobilizers and enhance polysulfide conversion kinetics. Although metal oxides, nitrides, and carbides show interestingly high theoretical binding energy, they possess inferior electronic conductivity.

Among the aforementioned challenges, the conversion of lithium polysulfides to lithium sulfide during discharge and to sulfur during recharge is a performance-determining factor for high efficiency Li—S batteries. The mechanism of polysulfide dissolution shows the clear distinction between the electrochemistry of Li—S batteries. The active material, such as sulfur for example, goes through a series of complex reactions forming a variety of lithium polysulfides during charging/discharging cycles. Ineffective conversion of soluble lithium polysulfides (LiPSs) to insoluble short-chain LiPSs results in a shuttling effect that forms an insulating layer on the anode surface, thereby causing loss of active material and corrosion of the Li anode. Since a typical Li—S battery relies on a considerable dissolution of the intermediate polysulfides into the electrolyte, unwanted side-reactions occur which consume the active material and cause detrimental electrochemical effects to the overall performance of Li—S batteries.

SUMMARY

The present application is directed to systems and devices using and methods of manufacturing two-dimensional (2D) transition metal dichalcogenide (TMD) materials (e.g., $MoS_2$, $MoSe_2$, $MoWeTe_2$, BN—C, etc.) as catalysts for sulfur (S) cathodes in Li—S batteries. The TMD materials may comprise single metals or alloys of TMD materials. Using a material, such as carbon, that is coated in TMD material(s) as a cathode improves catalyzing polysulfide reactions and reduces polysulfide dissolution in electrolytes. Additionally, alloying 2D TMDs according to the present disclosure is a highly efficient method for enhancing LiPS catalysis, and aspects described herein synthesize 2D TMDs alloy catalysts in a scalable and tunable manner. 2D TMDs alloys demonstrate synergetic and improved catalytic effect for LiPSs when compared to catalysts using pure (e.g., un-alloyed) 2D TMDs because the LiPS conversion kinetics can be tuned by varying the alloying ratio.

In operation according to one or more aspects, 2D TMD materials (e.g., single metals or alloys) may be used as catalysts for sulfur (S) cathodes in Li—S batteries. The 2D TMD catalysts are preferably formed directly onto a carbon structure (e.g., graphite, graphene, activated carbon, carbon nanotubes, porous carbon structures in 1D, 2D or 3D structures) of a carbon-sulfur cathode electrode. 2D TMD catalysts of aspects may be fabricated using a two-step method: (1) metal or metal alloy deposition by (co—)sputtering, and (2) sulfurization, selenization, tellurization, other chalcogen reactions suitable for operations discussed herein, or combinations thereof. The catalyst system is preferably composed of TMD metals or binary 2D TMD alloys (e.g., $Mo_{1-x}W_xS_2$, $Mo_{1-x}W_xSe_2$, $Mo_{1-x}W_xTe_2$, etc.), and, if TMD alloys are used, the composition of the 2D TMD alloys may be controlled by varying the power applied to each of the two metal targets (e.g., Mo and W, or other combination of transition metals) while co-sputtering. For example, the deposition power ratio may be increased from 0-1 to fabricate $Mo_{1-x}W_xS_2$ alloys with different compositions. 2D TMDs formed according to aspects may be used to catalyze polysulfide reactions, reduce polysulfide dissolution in electrolytes, and thus improve battery performance. Additionally, the fast conversion of soluble polysulfides enhances the cycle life and energy density of Li—S batteries by decreasing polysulfide accumulation in the sulfur cathode and polysulfide loss from the cathode by diffusion. Additionally, 2D TMDs alloys formed according to aspects on carbon structures exhibit significantly enhanced polysulfide conversion kinetics.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific implementations disclosed may be readily utilized as a basis for modifying or designing other structures for carrying out the same purposes of the present invention. It should also be realized by those skilled in the art that such equivalent constructions do not depart from the spirit and scope as set forth in the appended claims. The novel features which are believed to be characteristic of the present disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Various features and advantageous details are explained more fully with reference to the non-limiting aspects that are illustrated in the accompanying drawings and detailed in the following description. Descriptions of well-known starting materials, processing techniques, components, and equipment are omitted so as not to unnecessarily obscure the implementations in detail. It should be understood, however, that the detailed description and the specific examples, while indicating various aspects, are given by way of illustration only, and not by way of limitation. Various substitutions, modifications, additions, and/or rearrangements within the spirit and/or scope of the underlying inventive concept will become apparent to those skilled in the art from this disclosure.

Figure 1A:
FIGS. 1A-1D illustrate cross-sectional view of a two-step method for fabricating a 2D TMD alloy catalyst in accordance with one or more aspects of the present application.

According to certain aspects, two-dimensional (2D) transition metal dichalcogenides (TMDs) metals or alloys may be synthesized using a two-step deposition method-(1) metal sputtering (or metal co-sputtering for alloys), followed by (2) a chalcogen reaction (e.g., one or more of sulfurization, selenization, tellurization, etc.)—for use as polysulfide catalysts in lithium-sulfur (Li—S) batteries. As illustrated by FIGS. 1A-1D, methods for fabricating an exemplary 2D TMD catalyst are illustrated in accordance with one or more aspects of the present application. Referring to FIG. 1A, prior to formation of 2D TMD materials thereon, substrate 101 may include conductive substrates such as, for example, carbon nanotube (CNT) paper, activated carbon, porous carbon structures in 1D, 2D or 3D structures, carbon powder, carbon fibers, graphite, graphene, graphene oxides, or other materials suitable for operations described herein. In some implementations, substrate 101 may be cleaned, for example, with acetone using an ultrasonic bath, followed by cleaning with ethanol, methanol, and deionized water. It is noted that those skilled in the art should appreciate that there are other methods for cleaning substrate 101 that are suitable for operations discussed herein.

Figure 1B:
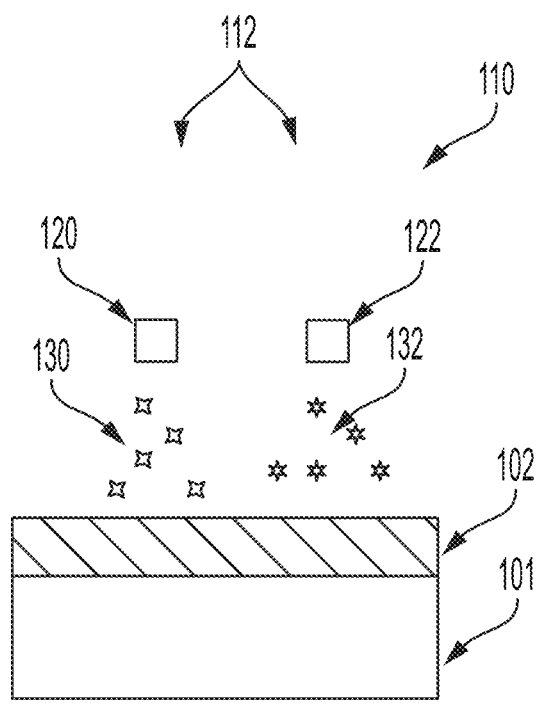

Referring to FIG. 1B, alloy layer 102 may be synthesized on substrate 101. According to aspects, alloy layer 102 may be formed by co-sputtering one or more layers of first target 120 and second target 122 onto substrate 101. Targets 120 and 122 may each comprise a material such as, for example, silicon (Si), germanium (Ge), tin (Sn), lead (Pb), antimony (Sb), aluminum (Al), titanium (Ti), tantalum (Ta), molybdenum (Mo), niobium (Nb), tungsten (W), hafnium (Hf), nickel (Ni), cobalt (Co), cadmium (Cd), and/or other metals suitable for forming 2D TMDs. It is appreciated that different metals may provide for 2D TMDs with different performance. For example, an Mo—W alloy may be used because it is a stable alloy that can be made into stable Mo—W—S$_2$, Mo—W—Se$_2$, Mo—W—Te$_2$, or like alloys. Using targets 120 and 122 (e.g., any of the aforementioned materials) as the target material for magnetron radio frequency (RF) co-sputtering, one or more successive layers of alloy layer 102 may be deposited onto substrate 101 to produce an alloy-coated substrate. In some implementations, inert gas 112 such as, for example, pure (~99.999% purity) argon, helium, or other gases with low reactivity with other substances may be fed into chamber 110 via a gas inlet valve (not depicted) during co-sputtering. Co-sputtering targets 120 and 122 onto substrate 101 preferably occurs within chamber 110 at temperatures set between room temperature and 500° C. In some implementations, chamber 110 may be evacuated, before each co-sputtering run, to a vacuum level of, e.g., ≤2×10$^{-6}$ Torr without plasma. In operation according to aspects, co-sputtering of transition metal ions of targets 120 and 122 may start when an RF power of 10-100 W is applied to targets 120 and 122 and one or more layers of transition metals alloys are consequently deposited on substrate 101. The co-sputtering duration may be varied from 1 second to 30 minutes to adjust the thickness of alloy layer 102. In some implementations, prior to deposition on substrate 101, targets 120 and 122 may be pre-sputtered in chamber 110 for a pre-determined time to stabilize the deposition process. Although described as forming an alloy layer, in some other implementations, a single metal layer may be formed. For example, one or more metal layers may be formed by sputtering a single metal source (e.g., corresponding to target 120, such as Si, Ge, Sn, Pb, Sb, Al, Ti, Ta, Mo, Nb, W, Hf, Ni, Co, Cd, or the like) onto substrate 101, similar to as described above.

The composition of alloy layer 102 (e.g., Mo$_{1-x}$W$_x$, Nb$_{1-x}$W$_x$, Mo$_x$Nb$_{(1-x)}$, etc.) is preferably controlled by varying the power (P) applied to each of targets 120 and 122. For example, the co-sputtering power ratio for Mo (e.g., corresponding to target 120) and W (e.g., corresponding to target 122) metals, represented as P(W)/[(P(Mo)+P(W)], may be increased from 0-1 to fabricate resulting Mo$_{1-x}$W$_x$S$_2$ alloys, as discussed below, with different compositions. Additionally or alternatively, the composition of alloy layer 102 may be tuned by varying the respective sputtering duration applied for each of targets 120 and 122. Varying the composition of alloy layer 102 corresponds to systematic tradeoff between lithium polysulfides (LiPS) binding interaction, Li-ion diffusion, and electron conductive pathways, which allows for higher LiPS conversion kinetics. For example, 1T phase (metallic) molybdenum disulfide (MoS$_2$) shows higher catalytic activity for polysulfide conversion as compared to 2H phase MoS$_2$ (semiconducting) owing to its higher binding energy with LiPSs. However, the energy barrier for Li-ion diffusion on a pristine 2H MoS$_2$ (e.g., 0.47 eV) is lower than that for Li-ion diffusion on 1T MoS$_2$ (e.g., 0.8 eV). Additionally, the electron conductivity of metallic 1T MoS$_2$ may be six orders of magnitude higher than 2H MoS$_2$. It is noted that alloy layer 102 is depicted as a single layer on substrate 101 for purposes of illustration, rather than by way of limitation, and, in other implementations, alloy layer 102 may comprise one or more layers of binary transition metals.

Figure 1C:
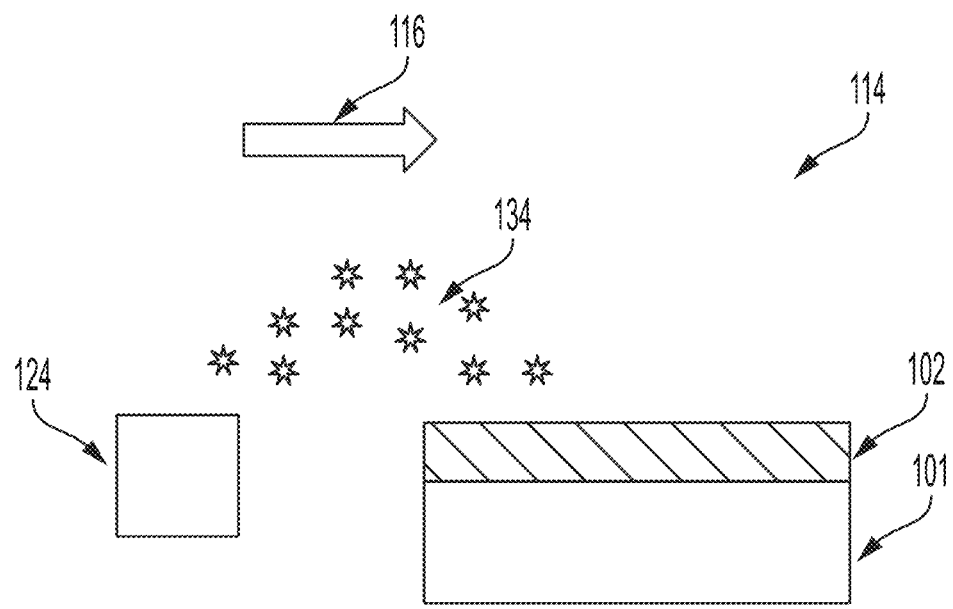
Figure 1D:
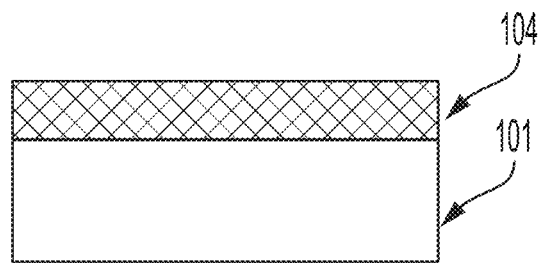

Turning to FIGS. 1C and 1D, alloy layer 102 may be converted into 2D TMD alloy layer 104. According to aspects, substrate 101 with alloy layer 102 formed thereon (e.g., metal alloy-coated substrate) may be transferred to a chemical vapor deposition (CVD) chamber 114 configured for Low-pressure CVD (LPCVD), Ultrahigh vacuum CVD (UHVCVD), or other chemical evaporation processes suitable for operations discussed herein. CVD chamber 114 may include inert gas flow 116 therein, and the alloy-coated substrate is preferably positioned downstream of chalcogen source 124 (e.g., sulfur (S), selenium (Se), tellurium (Te), other chalcogen sources, or composites thereof) and chalcogen vapors 134 produced from the same via evaporation. The chemical evaporation process preferably occurs within CVD chamber 114 at temperatures generally set between 100-800° C. According to aspects, CVD chamber 114 may include inert gas flow 116 therein, and inert gas flow 116 preferably corresponds to the flow of a carrier gas through CVD chamber 114 operative to transport chalcogen vapors 134 from chalcogen source 124 to alloy layer 102. For example, Argon may be employed as a carrier gas to transport sulfur vapor (e.g., corresponding to chalcogen vapors 134) to Mo$_{1-x}$W$_x$ metal alloys (e.g., corresponding to alloy layer 102) formed on CNT paper. In operation according to aspects, alloy layer 102 preferably reacts with chalcogen vapors 134 to form 2D TMD alloy layer 104, as depicted in FIG. 1D. In alternative implementations, chalcogen ions may be sputtered, consistent with operations discussed herein, onto the alloy-coated substrate to form 2D TMD alloy layer 104. In implementations in which a metal layer is formed on substrate 101, substrate 101 with the metal layer formed thereon may be transferred to CVD chamber 114 for CVD of chalcogen(s) to form a 2D TMD layer, similar to as described for 2D TMD alloy layer 104.

2D TMD alloy layer 104 (or a 2D TMD layer) of aspects may comprise stoichiometric or non-stoichiometric sulfides, phosphides, selenides, and tellurides of Si, Ge, Sn, Pb, Sb, Al, Ti, Ta, Mo, W, Hf, Ni, Nb, Co, Cd, and composites thereof. For example, 2D TMD alloy layer 104 (or a 2D TMD layer) may comprise molybdenum disulfide (MoS$_2$), tungsten disulfide (WS$_2$), molybdenum diselenide (MoSe$_2$), tungsten diselenide (WSe$_2$), molybdenum ditelluride (MoTe$_2$), niobium diselenide (NbSe$_2$), or other transition metal dichalcogenides. In additional aspects, Li—S battery cathodes may be fabricated by hot-pressing sulfur powder (99.98%, Sigma Aldrich) onto 2D TMD alloy layer 104 (or a 2D TMD layer) to obtain a binder-free catalytic sulfur cathode. It is noted that 2D TMD alloy layer 104 is depicted as a single layer on substrate 101 for purposes of illustration, rather than by way of limitation, and, in other implementations, 2D TMD alloy layer 104 (or a 2D TMD layer) may comprise one or more layers of 2D TMD alloys (or 2D TMDs).

In some implementations, the 2D TMD alloy layer 104 (or a 2D TMD layer) may be further processed by sulfur etching to create sulfur vacancy defects in the 2D TMD catalysts, which may further enhance their catalyst activity. In some such implementations, to create and control the sulfur vacancy defects, the prepared 2D TMD catalysts (e.g., the 2D TMD alloy layer 104 formed on the substrate 101, or a 2D TMD layer formed on the substrate 101) may be loaded into a quartz tube. The quartz tube may be evacuated until a pressure reaches approximately 10$^1$~10$^{-3}$ Torr. This treated sample (e.g., the 2D TMD catalysts) is treated to an annealing temperature (T) of 200-600° C. Simultaneously with treating the 2D TMD catalysts in the quartz tube to the annealing temperature, toluene is introduced at approximately 1~100 standard cubic centimeters per minute (sccm) to create one or more sulfur vacancy defects in the 2D TMD catalysts (e.g., the 2D TMD alloy layer 104 or a 2D TMD layer). Additionally or alternatively, solvent may be used for etching to create the sulfur vacancy defects. To illustrate, a solvent may be applied to 2D TMD alloy layer 104 (or a 2D TMD layer) to etch chalcogenides atoms (e.g., S, Se, or Te) from the 2D TMD alloy layer 104 (or the 2D TMD layer). For example, a liquid type solvent such as benzene, toluene, chloroform, acetone, or tetrahydrofuran (THF) may be dropped on the 2D TMD alloy layer 104 (or a 2D TMD layer) and, after an etching time of approximately 1~ 30 minutes, the 2D TMD alloy layer 104 (or the 2D TMD layer) may be cleaned, such as by being washed with ethanol or de-ionized (DI) water.

According to aspects, 2D TMDs alloy-coated carbon materials provide enhanced polysulfide conversion kinetics. In turn, the fast conversion of soluble polysulfides enhances the cycle life and energy density of Li—S batteries by decreasing their accumulation in the sulfur cathode and their loss from the cathode by diffusion. For example, scalable synthesis of $Mo_{0.5}W_{0.5}S_2$ alloys on carbon nanotube (CNT) paper (e.g., $Mo_{0.5}W_{0.5}S_2$-CNT) promotes the conversion kinetics of LiPS in Li—S batteries, as discussed below with respect to an experimental implementation of the present application. 2D TMD alloys possess the synergetic effect of mixed 2H-1T phases, resulting in an improved electron transfer and LiPS conversion as compared to pristine 2D TMDs. For example, a systematic phase transition between the 1T-2H phase and bandgap engineering are possible by varying the composition of W with respect to $MoS_2$ in an $MoWS_2$ alloy. Obtaining such meta-phase structures can result in higher catalytic activity and electron conductivity in the final alloy. Computational studies using the first-principle density functional theory (DFT) for $MoWS_2$ alloy as a hydrogen evolution (HER) catalyst have shown an improved electrochemical performance due to a reduction in the band gap for an experimental 2D TMD alloy (e.g., $Mo_{0.5}W_{0.5}S_2$), as compared to pristine 2D TMD samples (e.g., non-alloyed $MoS_2$ or $WS_2$). The induced delocalization of valance and the conduction band minimum can provide faster proton charge-transfer and can enhance the overall electronic conductivity. Electron transfer from $WS_2$ to $MoS_2$ is favored because of the lowering of Gibbs free energy, generating an electron rich condition for enhanced absorption-desorption kinetics for a higher electrocatalytic performance.

Figure 2:
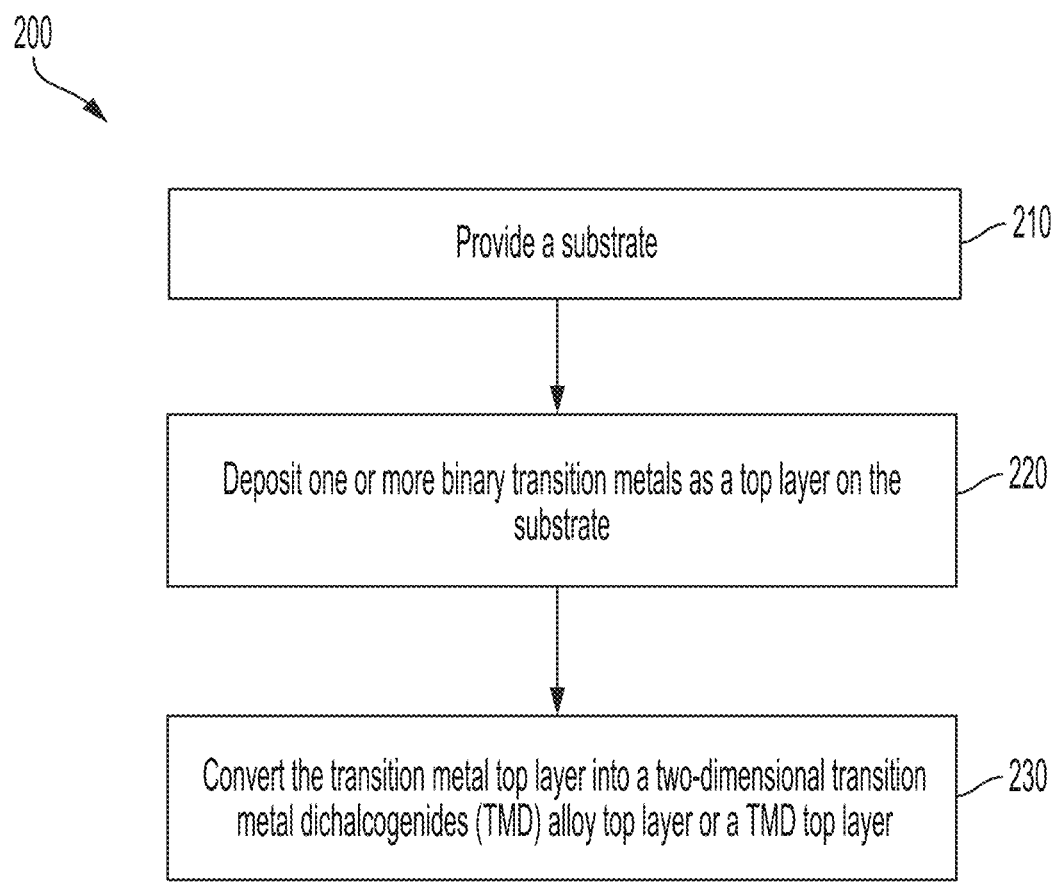
FIG. 2 is a flow diagram of a method for fabricating a 2D TMD alloy catalyst in accordance with one or more aspects of the present application.

FIG. 2 illustrates method 200 in accordance with one or more aspects of the present application. In certain implementations, method 200 may correspond to the exemplary fabrication processes illustrated and described with reference to FIGS. 1A-1D. At block 210, method 200 includes providing a substrate (e.g., corresponding to substrate 101 of FIG. 1A). In some implementations, the substrate may include CNT paper, activated carbon, porous carbon structures in 1D, 2D or 3D structures, carbon powder, carbon fibers, graphite, graphene, graphene oxides, or other materials suitable for operations described herein. Additionally, the substrate may be cleaned in preparation for subsequent fabrication steps. For example, the substrate may be cleaned according to methods discussed above. In certain implementations, an interface layer (not illustrated) may be inserted, which may provide for better adhesion of a 2D TMD layer onto the substrate. For example, the interface layer may include a plasma (e.g., Ar, He, $H_2$, $N_2$, etc., gas) treated clean surface, a deposited metallic layer, a functionalized interface layer (e.g., vacuum treatment with hydrogen, fluorine, C—H bonding, or other functional group bonding), other materials suitable for promoting adhesion of transition metal and 2D TMD layer(s) onto the substrate, or combinations thereof.

At block 220, method 200 includes depositing one or more binary transition metals (e.g., corresponding to targets 120 and 122 of FIG. 1B) onto the substrate to form a metal alloy top layer (e.g., corresponding to alloy layer 102 of FIG. 1B) or a metal top layer. For example, a single transition metal, two transition metals, or more than two transition metals may be deposited on the substrate. The transition metal(s) may include Si, Ge, Sn, Pb, Sb, Al, Ti, Ta, Mo, Nb, W, Hf, Ni, Co, Cd, and/or other metals suitable for forming 2D TMDs. In certain implementations, the power (e.g., magnetron RF) applied to each of the transition metals while co-sputtering may be varied with respect to the other to control the composition of the metal alloy top layer.

At block 230, method 200 includes converting the metal alloy top layer into a 2D TMD alloy layer (e.g., corresponding to 2D TMD alloy layer 104 of FIG. 1D) within a CVD chamber (e.g., corresponding to CVD chamber 114 of FIG. 1C) via reactions with a chalcogen source (e.g., corresponding to chalcogen source 124 of FIG. 1C). In some alternate implementations, the metal top layer may be converted into a 2D TMD layer within the CVD chamber via reactions with the chalcogen source. The chalcogen source may include sulfur, selenium, tellurium, other chalcogen sources, or composites thereof. In certain implementations, a gas flow (e.g., corresponding to inert gas flow 116 of FIG. 1C) may transport chalcogen vapors (e.g., corresponding to chalcogen vapors 134 of FIG. 1C), formed via chemical evaporation by heating the CVD chamber, to the metal alloy-coated substrate or the metal-coated substrate. Chemical reactions between the chalcogen vapors and the metal alloy top layer (or the metal top layer) preferably convert the metal alloy top layer into a 2D TMD alloy top layer (or a 2D TMD top layer). As such, the resulting 2D TMD alloy may include sulfides, phosphides, selenides, tellurides, and polonides of Si, Ge, Sn, Pb, Sb, Al, Ti, Ta, Mo, W, Hf, Ni, Nb, Co, Cd, and composites thereof. In alternative implementations, the metal alloy top layer (or the metal top layer) may be converted into a 2D TMD alloy (or a 2D TMD top layer) by sputtering (e.g., magnetron RF) ions from the chalcogen source onto the metal alloy-coated substrate (or the metal-coated substrate). In additional implementations, Li—S battery cathodes may be fabricated by hot-pressing sulfur powder (99.98%, Sigma Aldrich) onto 2D TMD alloy layer 104 (or the 2D TMD layer) to obtain a binder-free catalytic sulfur cathode. Additionally or alternatively, the cathode may be fabricated by creating sulfur vacancy defects in the 2D TMD alloy layer 104 (or the 2D TMD layer), such as by using pressure and temperature or by applying liquid type solvent, as described above.

Figure 3:
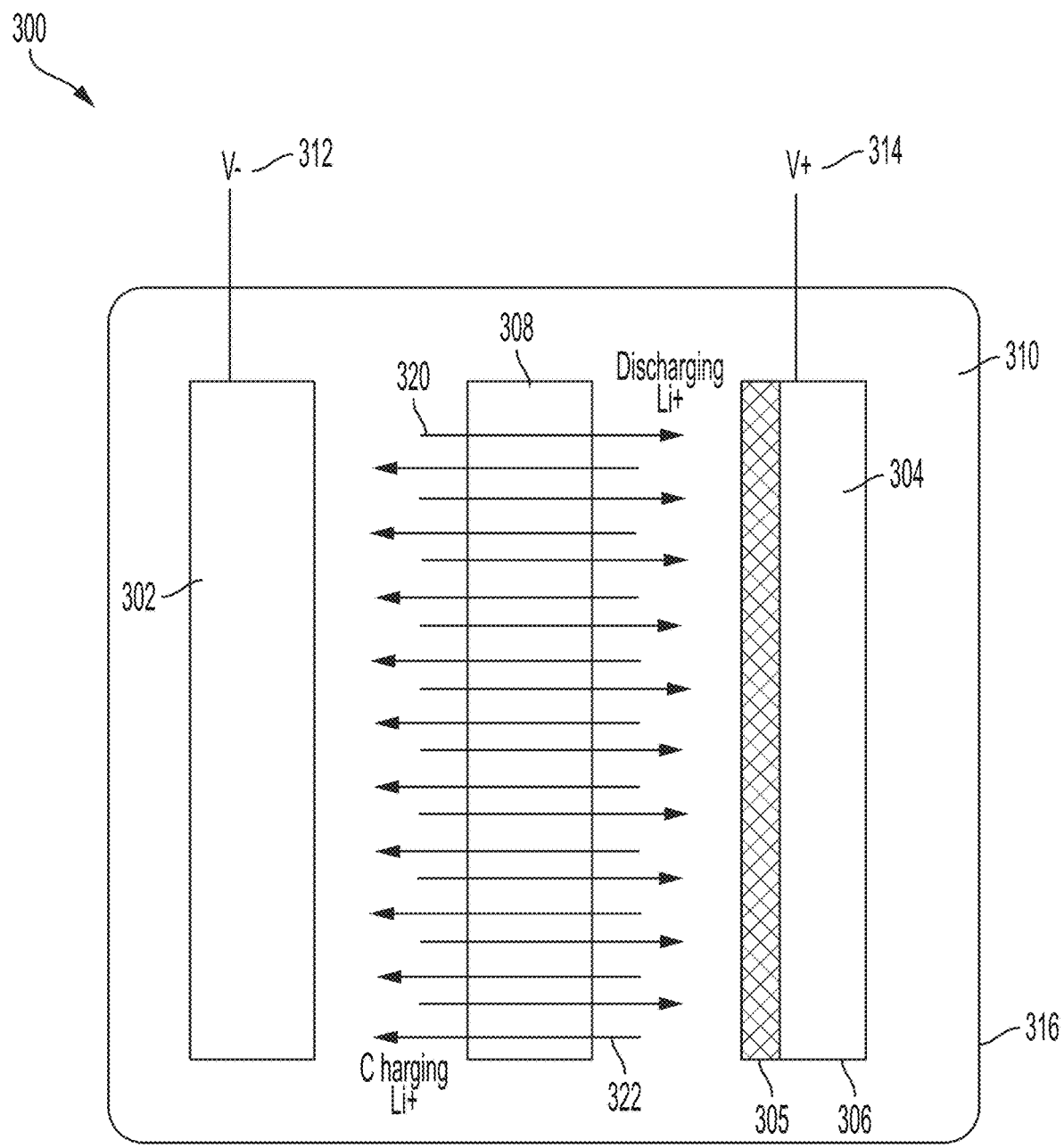
FIG. 3 illustrates a battery system implemented with a 2D TMD alloy-coated cathode in accordance with one or more aspects of the present application.

FIG. 3 illustrates an example Li—S battery (LSB) system in accordance with one or more aspects of the present application. In some implementations, LSB system 300 may include anode 302, cathode 304, separator 308, electrolyte 310, current collectors 312 and 314, and casing 316. Anode 302 may be a conductive substrate and may include, for example, an electrode made of Li, Na, Mg, or other conductive materials suitable for operations described herein. electrode. Although not illustrated, anode 302 may be additionally coated with at least one layer of 2D TMD alloy material, formed in accordance with method 200 of FIG. 2. Cathode 304 may include substrate 306 (e.g., corresponding to substrate 101 of FIGS. 1A-D) and 2D TMD alloy layer 305 (e.g., corresponding to 2D TMD alloy layer 104 of FIG. 1D) or a 2D TMD layer (e.g., formed from a single metal instead of an alloy), formed, for example, using method 200 of FIG. 2. Additionally, 2D TMD alloy layer 305 (or the 2D TMD layer) may be coated with one or more sulfur layers formed, for example, by hot-pressing sulfur powder thereon.

In operation according to one or more aspects, ion flow 320 illustrates the flow of discharging ions (e.g., $Li^+$, etc.) from anode 302, and ion flow 322 illustrates the flow of charging ions (e.g., $Li^+$, etc.) from cathode 304. Separator 308 may be positioned between anode 302 and cathode 304 and may include, for example, polypropylene (PP), polyethylene (PE), other materials suitable for operations discussed herein, or combinations thereof. Separator 308 preferably has pores through which ion flows 320 and 322 may pass. Electrolyte 310 may be positioned on either side of separator 308, between the respective anode 302 and cathode 304, and may include any number of electrolyte solutions (e.g., aqueous, non-aqueous, etc.) which may allow for transporting ion flows 320 and 322 between anode 302 and cathode 304. For example, electrolyte 310 may include various lithium salts (e.g., $LiPF_6$, $LiClO_4$, $LiH_2PO_4$, $LiAlCl_4$, $LiBF_4$, etc.) or other electrolyte material suitable for operations discussed herein.

According to some implementations, current collector 312 may be attached to anode 302 and current collector 314 may be attached to cathode 304. In operation according to some implementations, current collectors 312 and 314 may extend, through casing 316, from an interior region of casing 316 to an exterior region of casing 316. Additionally, current collectors 312 and 314 may correspond to negative and positive voltage terminals, respectively, and comprise conductive materials. For example, current collector 312 may include copper metal and current collector 314 may include aluminum metal. Casing 316 may include a variety of cell form factors. For example, implementations of LSB system 300 may be incorporated in a cylindrical cell (e.g., 13650, 18650, 18500, 26650, 21700, etc.), a polymer cell, a button cell, a prismatic cell, a pouch cell, or other form factors suitable for operations discussed herein. Further, one or more cells may be combined into larger battery packs for use in a variety of applications (e.g., vehicles, laptops, etc.). In certain implementations, microcontrollers and/or other safety circuitry may be used along with voltage regulators to manage cell operation and may be tailored to specific uses of LSB system 300.

Exemplary Li—S batteries fabricated using an $Mo_{0.5}W_{0.5}S_2$ catalyst (e.g., a 2D TMD alloy layer corresponding to 2D TMD alloy layer 104 of FIG. 1D) showed a significantly higher specific capacity of 1,228 mAh/g, as compared to that of a bare-CNT-S cathode (808 mAh/g) at 0.1 C, and a higher cyclic stability with a capacity retention of 750 mAh/g (80%) after 400 cycles at 0.5 C. Moreover, an $Mo_{0.5}W_{0.5}S_2$ catalyst according to some implementations provides lower interfacial and charge-transfer resistance for an $Mo_{0.5}W_{0.5}S_2$—CNT—S cathode, resulting in much higher Li-ion diffusion and LiPS conversion in the sulfur cathode. In contrast, conventional Li—S batteries exhibit shorter life spans of 100 cycles with a significantly lower discharge capacity of <500 mAh/g. This efficient LiPS conversion prevents the shuttling effect and corrosion of Li anode prevalent in conventional Li—S batteries, resulting in a higher cyclic stability of an Li—S battery fabricated using 2D TMD alloyed cathode (e.g., $Mo_{0.5}W_{0.5}S_2$—CNT—S cathode, etc.). Accordingly, 2D TMD alloy-based catalysts that are directly grown on the carbon matrix (e.g., corresponding to substrate 101 of FIGS. 1A-1D) may serve as high efficiency electrocatalysts for polysulfides conversion to improve Li—S battery performance.

Figure 4:
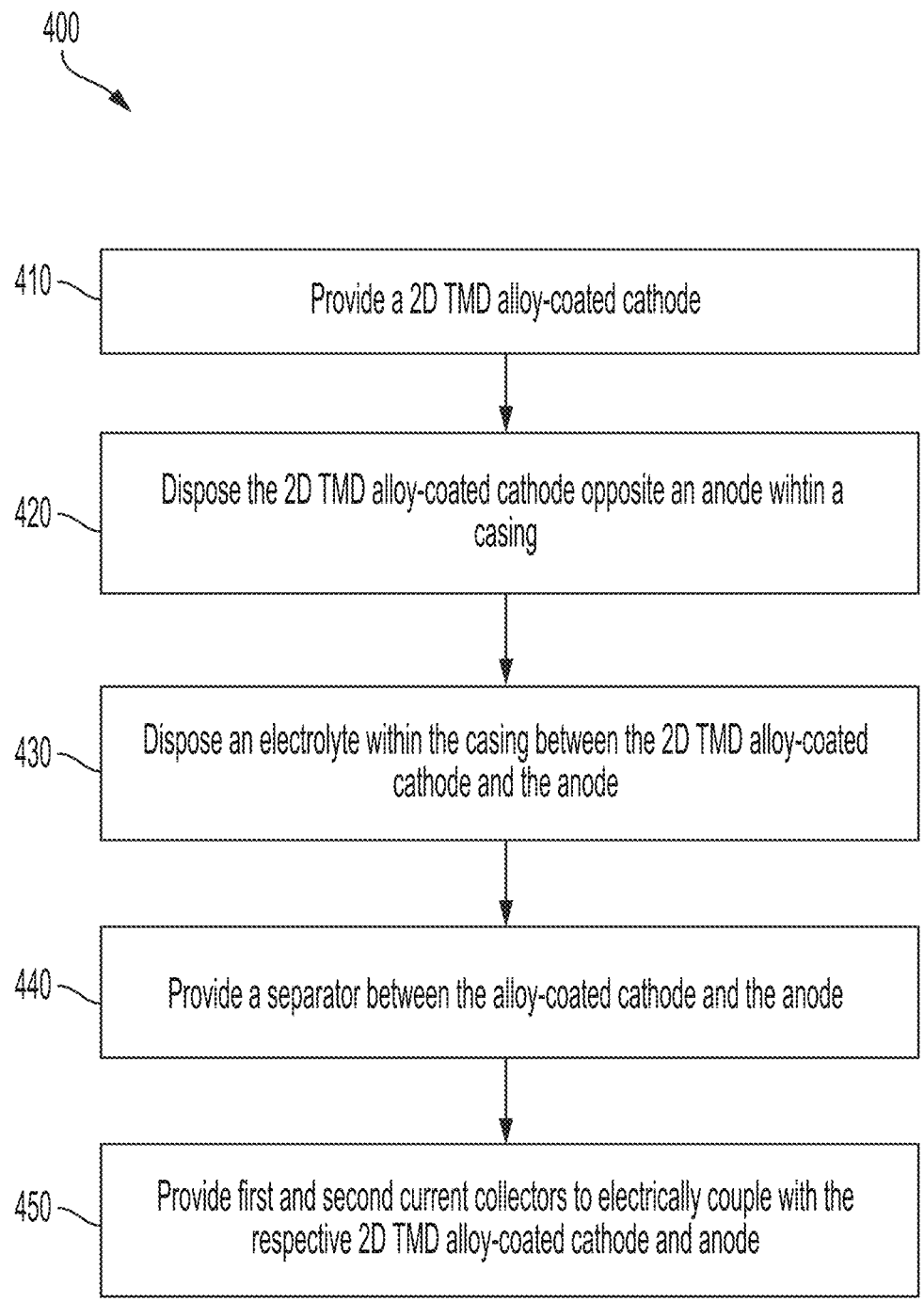
FIG. 4 is a flow diagram of a method for manufacturing a battery system with a 2D TMD alloy-coated cathode in accordance with one or more aspects of the present application.

FIG. 4 illustrates method 400 in accordance with one or more aspects of the present application. In certain implementations, method 400 may correspond to an exemplary processes for manufacturing an LSB system illustrated and described with reference to FIG. 3. It should be appreciated by those skilled in the art that the specific arrangement of exemplary method 400 discussed below may be readily utilized as a basis for modifying or designing other manufacturing methods for carrying out the operations described herein. It should also be realized by those skilled in the art that such equivalent arrangements do not depart from the spirit and scope of the present application.

At block 410, method 400 includes providing a 2D TMD alloy-coated cathode. In certain implementations, the cathode may be fabricated by forming a 2D TMD alloy layer on a conductive substrate (e.g., corresponding at least to substrate 101 and 2D TMD alloy layer 104 of FIG. 1D and a cathode formed according to method 200 of FIG. 2). Additionally, sulfur powder may be hot-pressed onto the 2D TMD alloy layer to obtain a binder-free catalytic sulfur cathode. In some other implementations, a 2D TMD-coated cathode may be provided, the cathode fabricated by forming a 2D TMD layer (e.g., from a single metal instead of an alloy) on a conductive substrate (e.g., corresponding at least to substrate 101 of FIGS. 1A-D).

At block 420, method 400 includes disposing the 2D TMD alloy-coated cathode (or the 2D TMD-coated cathode) opposite an anode (e.g., corresponding to anode 302 of FIG. 3) within a casing (e.g., corresponding to casing 316 of FIG. 3). In certain implementations, the anode may be a conductive substrate such as, for example, Lithium. Additionally, the anode may be coated with at least one layer of 2D TMD alloy material (e.g., corresponding to 2D TMD alloy layer 104 of FIG. 1D and according to method 200 of FIG. 2) or a 2D TMD material (e.g., formed from a single metal instead of an alloy), and the anode is preferably oriented within the casing such that any 2D TMD alloy material or 2D TMD material thereon faces the corresponding 2D TMD alloy layer or 2D TMD layer of the cathode.

At block 430, method 400 includes disposing an electrolyte (e.g., corresponding to electrolyte 310 of FIG. 3) within the casing between the 2D TMD alloy-coated cathode (or the 2D TMD-coated cathode) and the anode. According to some implementations, the electrolyte may include any number of electrolyte solutions (e.g., aqueous, non-aqueous, etc.) which may allow for transporting ions (e.g., corresponding to ion flows 320 and 322 of FIG. 3) between the anode and cathode. For example, the electrolyte may include various lithium salts (e.g., $LiPF_6$, $LiClO_4$, $LiH_2PO_4$, $LiAlCl_4$, $LiBF_4$, etc.) or other electrolyte material suitable for operations discussed herein.

At block 440, method 400 includes providing a separator (e.g., corresponding to separator 308 of FIG. 3) between the 2D TMD alloy-coated cathode (or the 2D TMD-coated cathode) and the anode. The separator may include, for example, polypropylene (PP), polyethylene (PE), other materials suitable for operations discussed herein, or combinations thereof. In operation according to some implementations, the separator may include pores or other structures suitable to facilitate the flow or diffusion of ions between the anode and cathode within the electrolyte.

At block 450, method 400 includes providing first and second current collectors (e.g., corresponding to current collectors 312 and 314 of FIG. 3) to electrically couple with the respective 2D TMD alloy-coated cathode (or 2D TMD-coated cathode) and anode. According to some implementations, the first and second current collectors may correspond to negative and positive voltage terminals, respectively, and may comprise conductive materials such as, for example, copper, aluminum, gold, silver, other conductive materials, or combinations thereof. Additionally, a first end of the first current collector may be attached to the anode, within the casing, while the first current collector extends through the casing and a second end of the first current collector is located outside of the casing. Likewise, a first end of the second current collector is preferably attached to the cathode, and the second current collector extends through the casing such that a second end of the second current collector is located outside of the casing.

As described above, an exemplary LSB with a 2D TMD alloy-coated sulfur cathode or 2D TMD-coated sulfur cathode formed using method 400 provides for improved battery performance by catalyzing polysulfide reactions, enhancing polysulfide conversion kinetics, and reducing polysulfide dissolution in electrolytes. Additionally, such LSBs exhibit enhanced cycle life and energy density.

Experimental Testing of 2D TMD Alloy Catalysts

The following describes experimental implementations of 2D TMD alloy-coated cathodes and Li—S batteries incorporating the same. The discussion further illustrates possible performance advantages afforded by 2D TMD alloy catalysts according to implementations described herein. It should be appreciated by those skilled in the art that the scope of the present application is not intended to be limited to the particular experimental implementations described below. Additionally, some of the implementations and benefits discussed below may be achieved using 2D TMD-coated cathodes (e.g., formed from a single metal instead of an alloy) and Li—S batteries incorporating the same.

Figure 5:
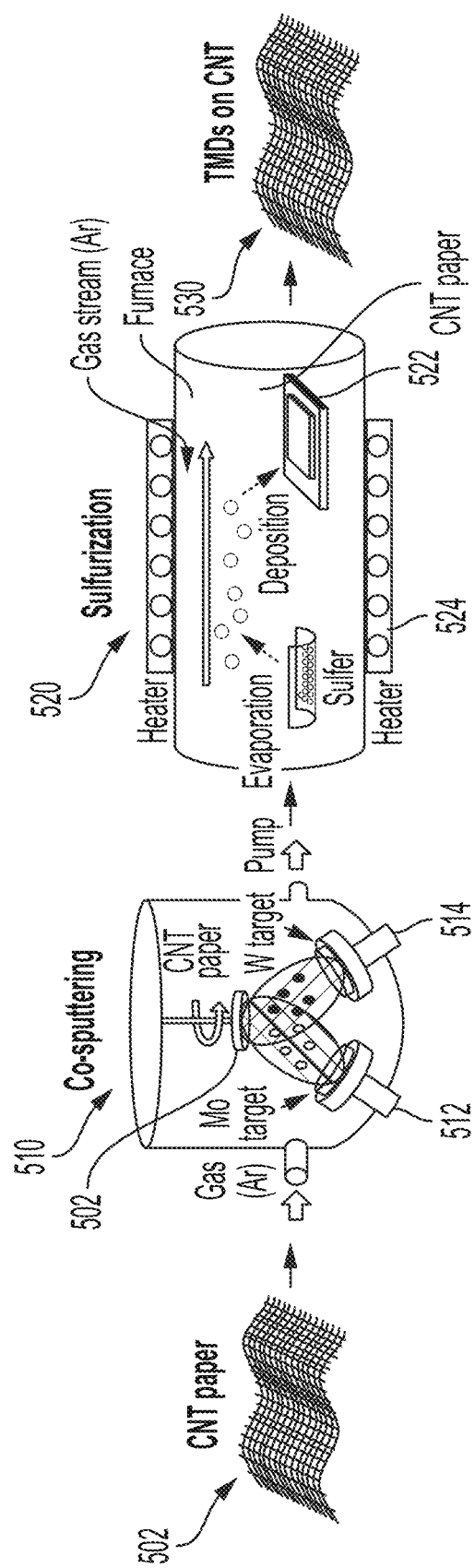
FIG. 5 illustrates a exemplary schematic for fabricating a 2D TMD alloy catalyst in accordance with one or more aspects of the present application.
Figure 6:
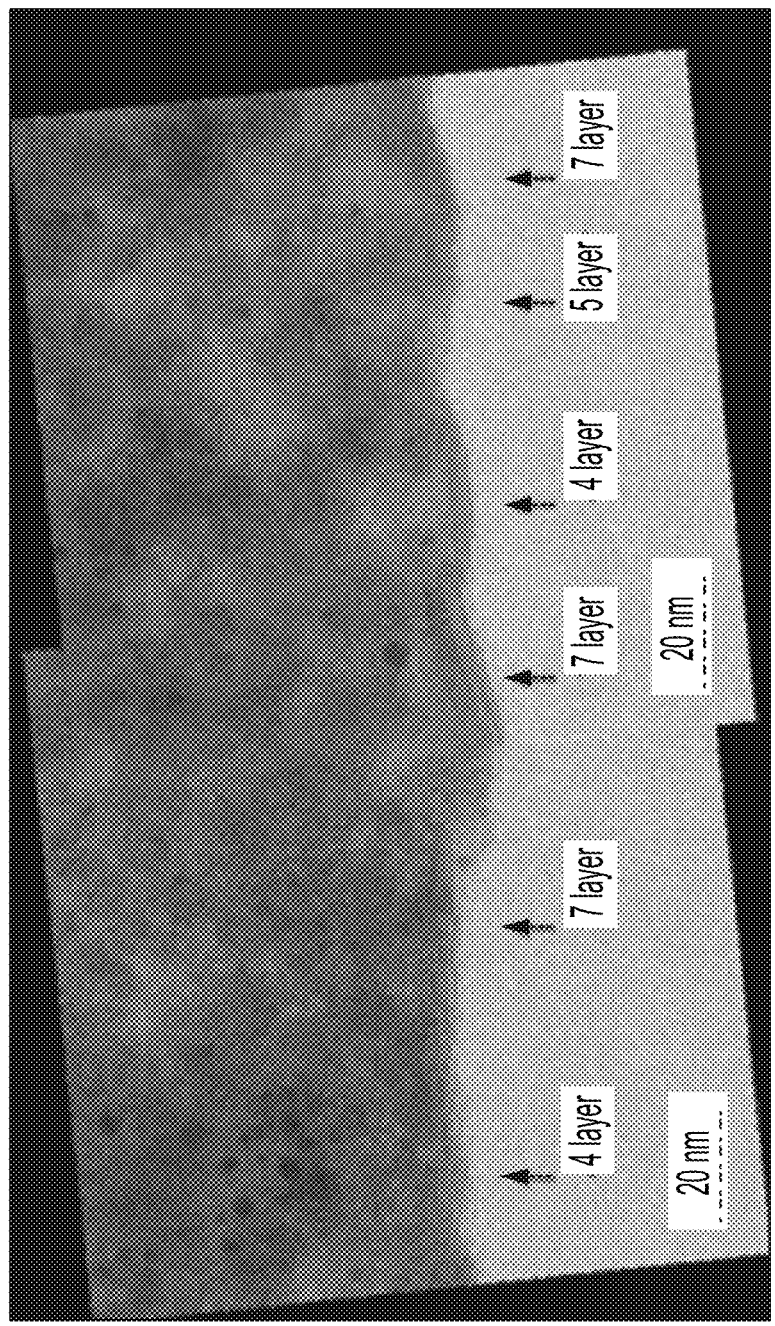
FIG. 6 illustrates scanning tunneling electron microscopy (STEM) image of an experimental implementation of the present application.

In an experimental implementation, 2D TMD alloy catalysts and CNT—Sulfur (CNT—S) cathodes were fabricated by coating CNT paper with one or more layers of $Mo_{0.5}W_{0.5}S_2$. A schematic illustration for an Li—S catalytic cathode fabricated according to one or more aspects is provided in FIG. 5. Molybdenum (e.g., corresponding to first target 120 of FIG. 1B) and Tungsten (e.g., corresponding to second target 122 of FIG. 1B) in a ratio of 1:1 were co-sputtered onto CNT paper 502 (e.g., corresponding to substrate 101 of FIGS. 1A-1D). The CNT paper 502 was transferred to an ultra-high vacuum chamber 510 (e.g., a chamber at 10-6 Torr and corresponding to chamber 110 of FIG. 1B) of a RF magnetron co-sputtering system. Co-sputtering of molybdenum (Mo) 512 and tungsten (W) 514 (e.g., corresponding to targets 120 and 122 of FIG. 1B, respectively) was performed using argon plasma (99.99%, Ar gas), with a deposition power of 30 W for 10 s each. The MoW-coated CNT paper 522 was placed in a ceramic boat within a LPCVD chamber 520 (e.g., corresponding to CVD chamber 114 of FIG. 1C) and downstream of a quartz tube for sulfurization at 600° C. Sulfur vapors were transferred to the MoW-coated CNT substrate 522 using Ar-gas (e.g., gas flow of 80 sccm and corresponding to inert gas flow 116) at 600° C. for 1 h at a ramp rate of 15° C./min via heaters 522 and 524, while the working pressure of the chamber was maintained at 5 Torr, to form TMD-coated CNT paper 530. FIG. 6 illustrates a scanning tunneling electron microscopy (STEM) image of four to seven layers of $Mo_{0.5}W_{0.5}S_2$ deposited on a carbon transmission electron microscopy (TEM) grid. The average thickness of each $Mo_{0.5}W_{0.5}S_2$ layer was 3-5 nm with polycrystalline grain sizing from 20-50 nm. The weight change of the CNT paper was negligible during the deposition process, and thus the fabrication techniques in accordance with aspects discussed herein may provide for uniform growth of 2D TMD alloys on a variety of large-scale substrates (e.g., silicon wafers, CNT sheets, etc.).

The battery performance of the experimental $Mo_{0.5}W_{0.5}S_2$—CNT paper as a sulfur host was also tested in an Li—S battery. The catalytic performance of the experimental 2D TMD catalyst-coated CNT paper implementation was analyzed by fabricating a symmetrical cell and a coin cell. The symmetrical cells were assembled in an Ar-filled M-Brum glove box using catalyst-coated CNT paper as the anode and cathode, a Celgard 2400 separator, and 60 μL electrolyte containing 0.2 M $Li_2S_6$ and 1 M LiTFSi in a 1:1 (v/v) DME/DOL mixture. The Li—S battery full cells were fabricated using Li-metal foil as the anode (120 m thick, Goodfellow), sulfur-loaded CNT paper as the cathode, a Celgard 2400 separator, and 20 μL (E/S ratio of 1:10) electrolyte composed of 1 M LiTFSi and 0.25 M $LiNO_3$ solution in a 1:1 (v/v) DME/DOL mixture. All the fabricated cells were then characterized by cyclic voltammetry (CV) tests and electrochemical impedance spectroscopy (EIS) (Gamry 3000). The galvanostatic charge-discharge behavior was analyzed using a multi-channel battery testing unit (Maccor-series 4000).

Figure 7A:
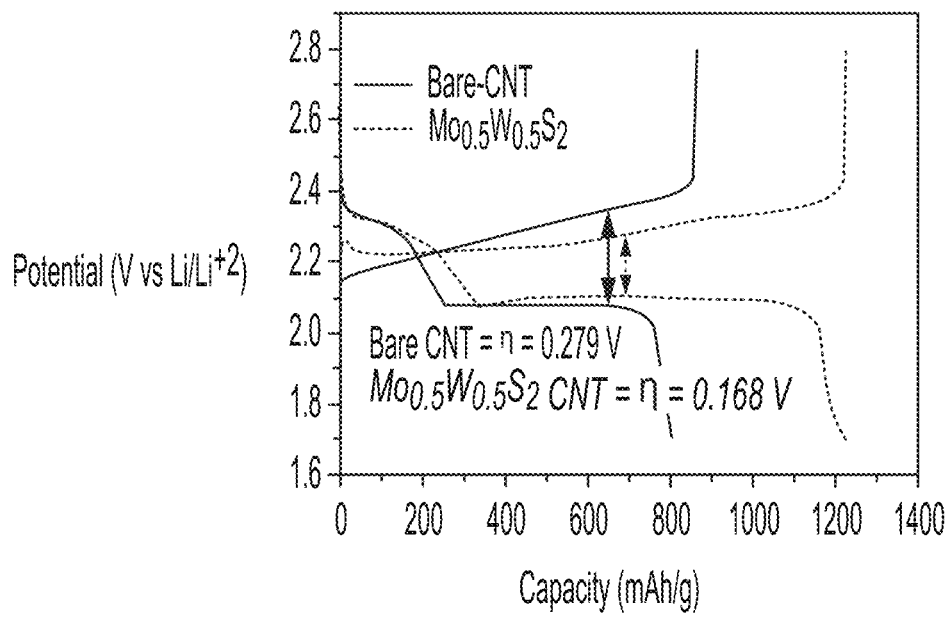
FIGS. 7A-7D illustrate testing measurements of an experimental implementation of the present application.

Direct contact of sulfur on the experimental catalyst-CNT paper demonstrated strong electrochemical interaction during the polysulfide reaction on the surface of the CNT paper, thus allowing for better reaction kinetics for the catalyst-CNT cathode during the galvanostatic charging and discharging test shown in FIG. 7A. The combined discharge capacity of the upper plateau for the experimental $Mo_{0.5}W_{0.5}S_2$—CNT—S was 338 mAh/g, which corresponds to approximately 80% of the theoretical limit (~419 mAh/g). Soluble $Li_2S_4$ was further reduced to $Sn^{2-}$ (n=2-1) with slower reaction kinetics and precipitate back on the cathode surface, resulting in a secondary discharge plateau in the GC curve. This behavior in the discharge plateau was related to 75% of the remaining discharge capacity. The specific capacities of $Mo_{0.5}W_{0.5}S_2$—CNT-S and bare-CNT—S cathodes at 0.1 C were observed to be 1,228 mAh/g and 808 mAh/g, respectively. Moreover, the observed capacity for the experimental $Mo_{0.5}W_{0.5}S_2$—CNT—S was much higher as compared to that of pristine $MoS_2$- (956 mAh/g) or $WS_2$-based (930 mAh/g) cathodes, as depicted in FIG. 8B, which is attributed to the superior catalytic activity of the mixed-phase 2D structure. The observed capacity for the experimental $Mo_{0.5}W_{0.5}S_2$—CNT—S was approximately 75% that of the maximum theoretical capacity of the Li—S battery.

Figure 7B:
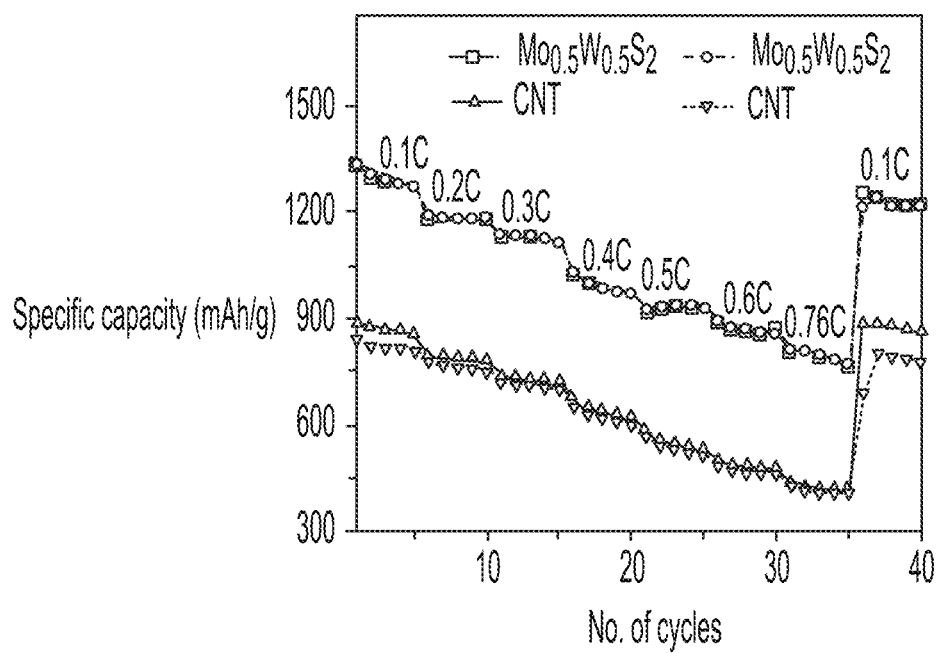
Figure 9A:
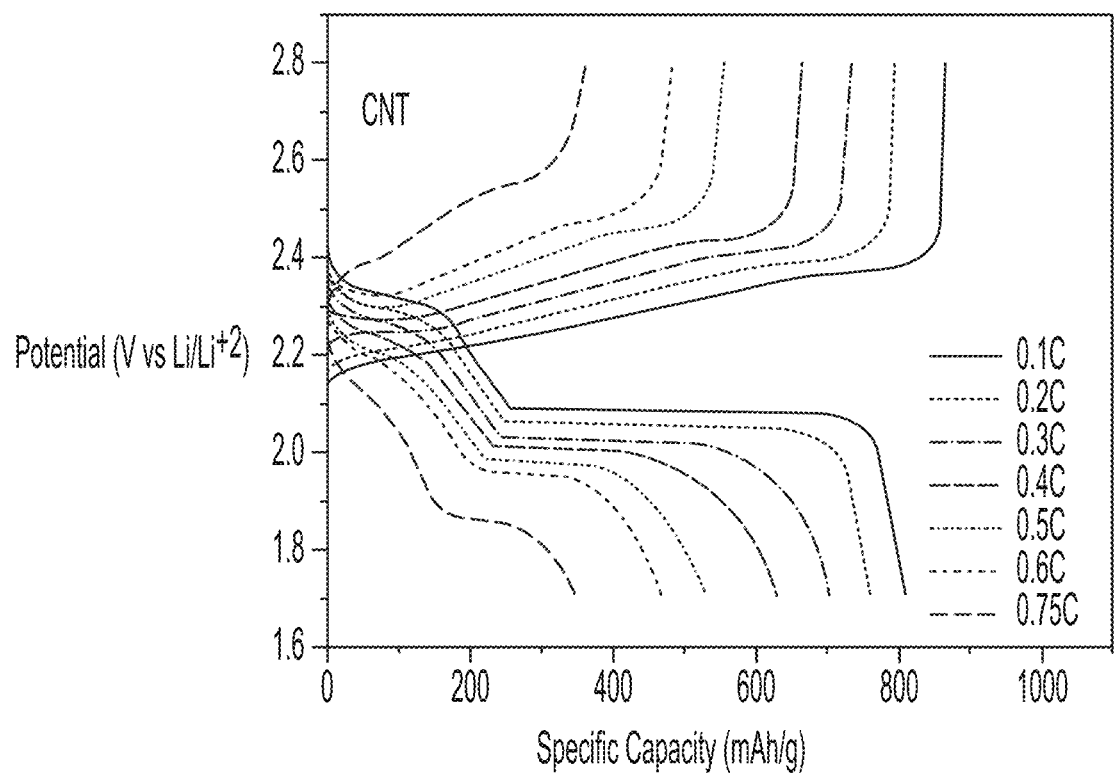
FIGS. 9A-9B illustrate testing measurements of an experimental implementation of the present application.
Figure 9B:
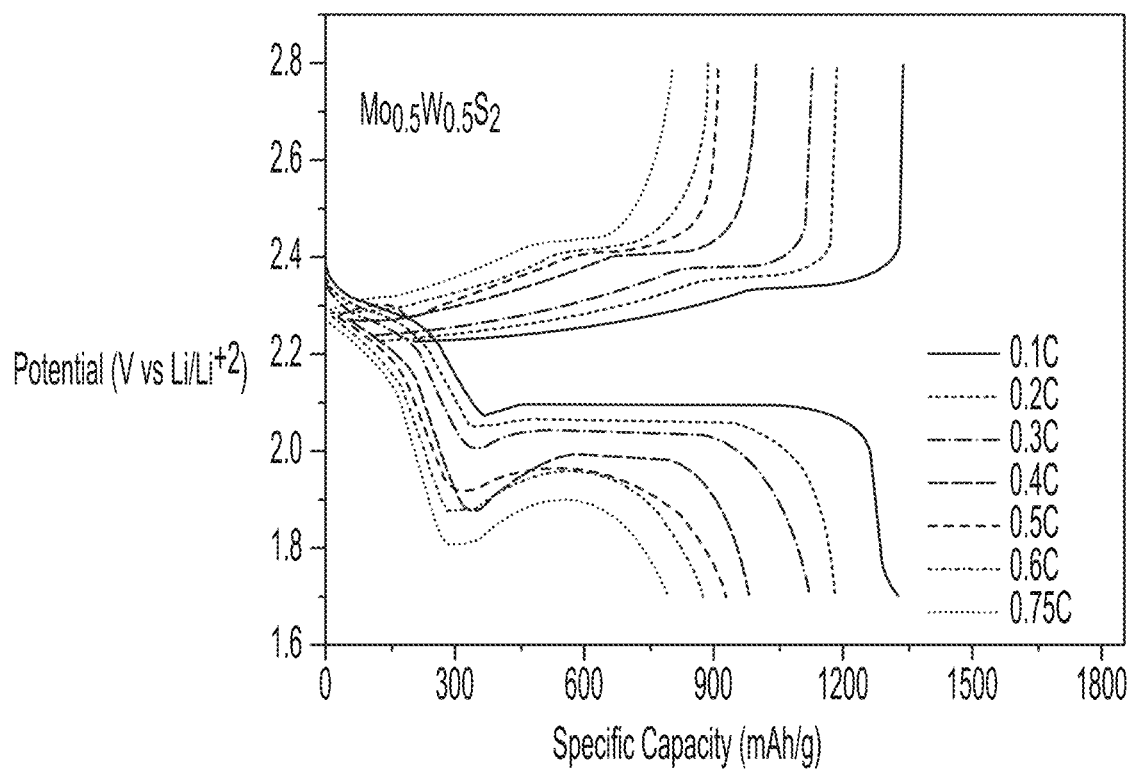

Higher capacity retention, coulombic efficiency, and improved cyclic performance are directly related to the improved catalytic activity of 2D TMD alloys. As shown in FIG. 7B, the cell performance of the experimental catalytic cathode was tested at different C-rates. The $Mo_{0.5}W_{0.5}S_2$—CNT—S cathodes exhibited a noticeably higher specific capacity and coulombic efficiency during testing when compared to a bare-CNT—S cathode. The improved performance corresponds to strong reaction kinetics for effective LiPS formation and reduction during the respective charging and discharging cycle, even at a higher C-rate, unlike the bare-CNT—S cathode. An exemplary full cell test for Li—S cathodes with and without an $Mo_xW_{1-x}S_2$ catalyst on CNT in accordance with the implementations discussed herein, depicted in FIGS. 9A-9B, shows high specific capacity and rate capability. Charging and discharging capacity for the exemplary $Mo_xW_{1-x}S_2$ (FIG. 9B) shows much higher cycle life than that of bare CNT (FIG. 9A).

Figure 7C:
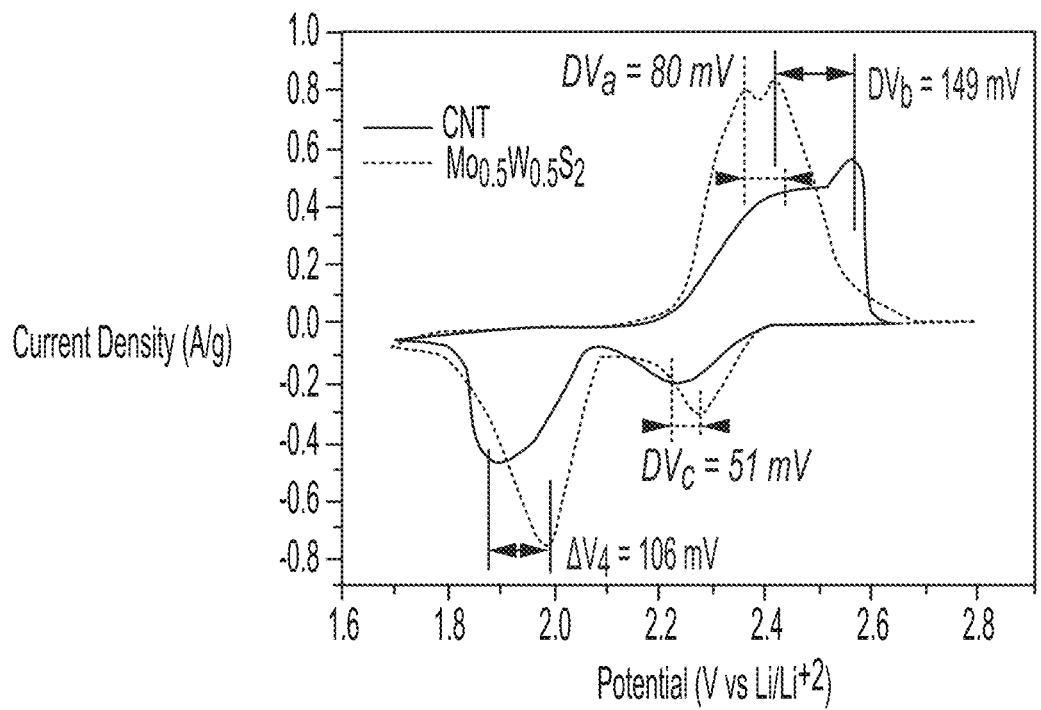
Figure 8A:
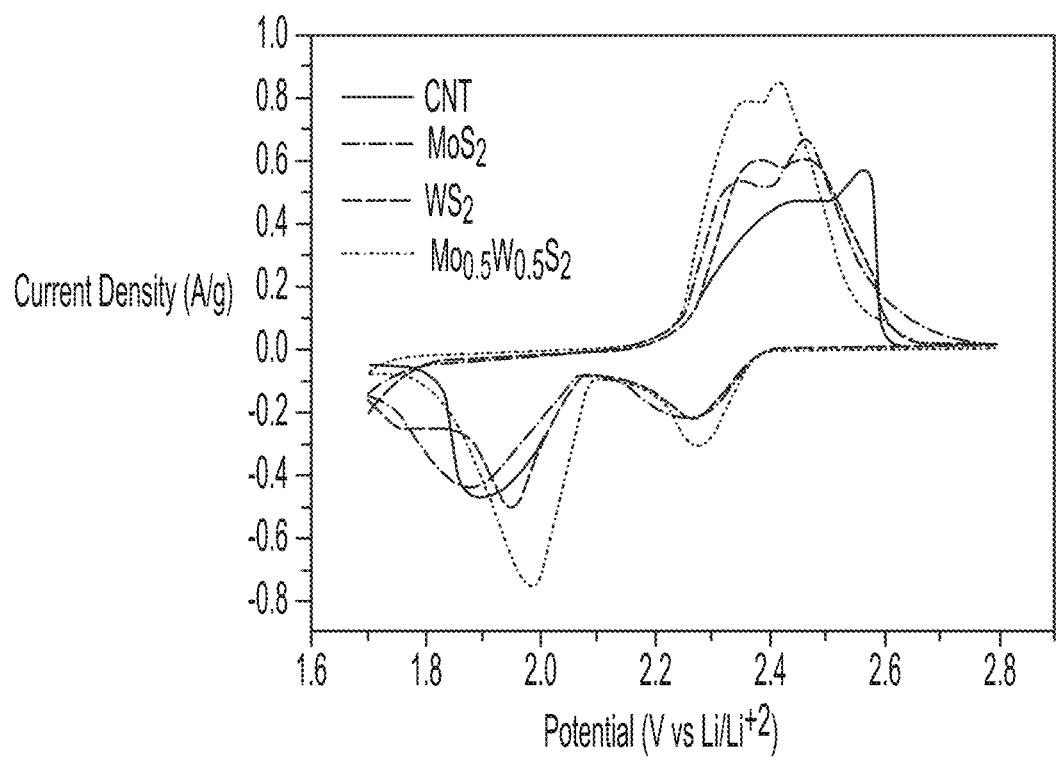
FIGS. 8A-8B illustrate testing measurements of an experimental implementation of the present application.
Figure 8B:
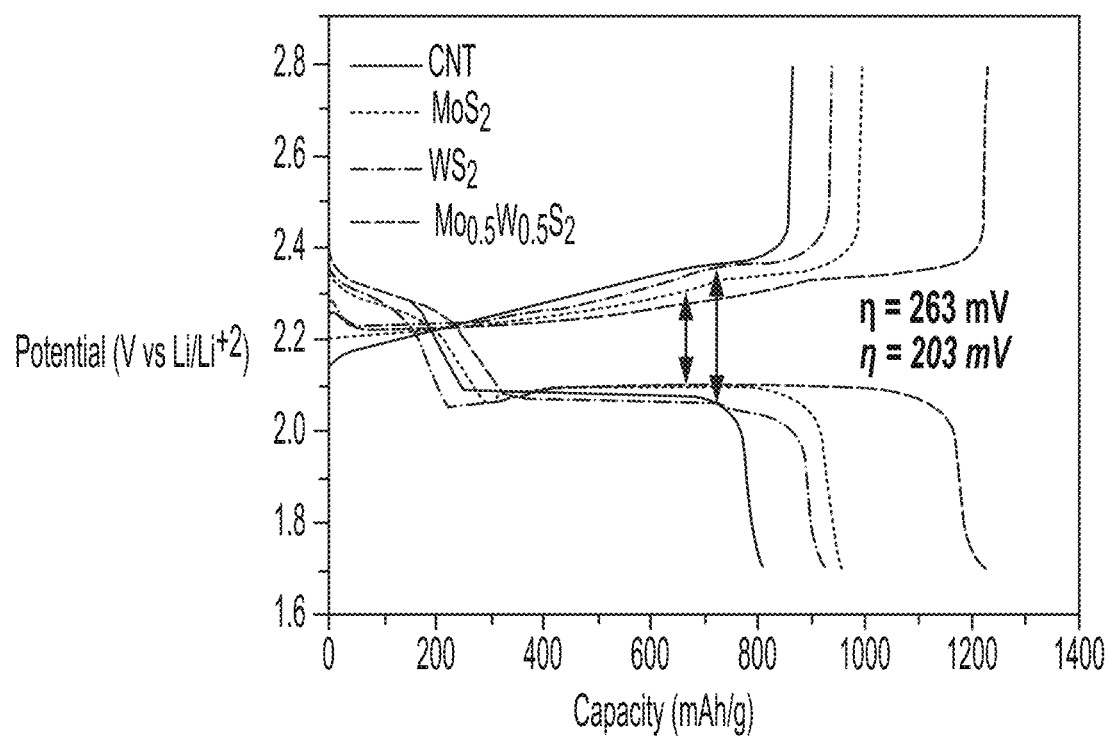

Referring to FIGS. 7C and 8A, Li—S battery cells according to the experimental implementation were further characterized via CV testing. The higher peak intensity observed in CV peaks confirms the better redox-activity for the $Mo_{0.5}W_{0.5}S_2$—CNT—S as compared to the bare-CNT—S cathode. The observed shifts in the oxidation peak toward lower potential and in the reduction peaks toward the higher potential side indicate faster reaction kinetics for the 2D TMD alloy, catalytic cathode as compared to the reference cathodes. The experimental $Mo_{0.5}W_{0.5}S_2$—CNT—S cathode exhibited a lower polarization overpotential of 168 mV compared to that of $MoS_2$—CNT—S(203 mV), $WS_2$—CNT—S(263 mV), and bare-CNT—S(279 mV) cathodes, as depicted in FIGS. 7C and 8A. This can be further correlated to the lower interfacial resistance with the electrolyte and reduced overall series resistance of the experimental $Mo_{0.5}W_{0.5}S_2$—CNT—S, resulting in the faster electron transfer as compared to pristine $MoS_2$, $WS_2$, or bare-CNT—S, thus improving the overall battery performance.

Figure 7D:
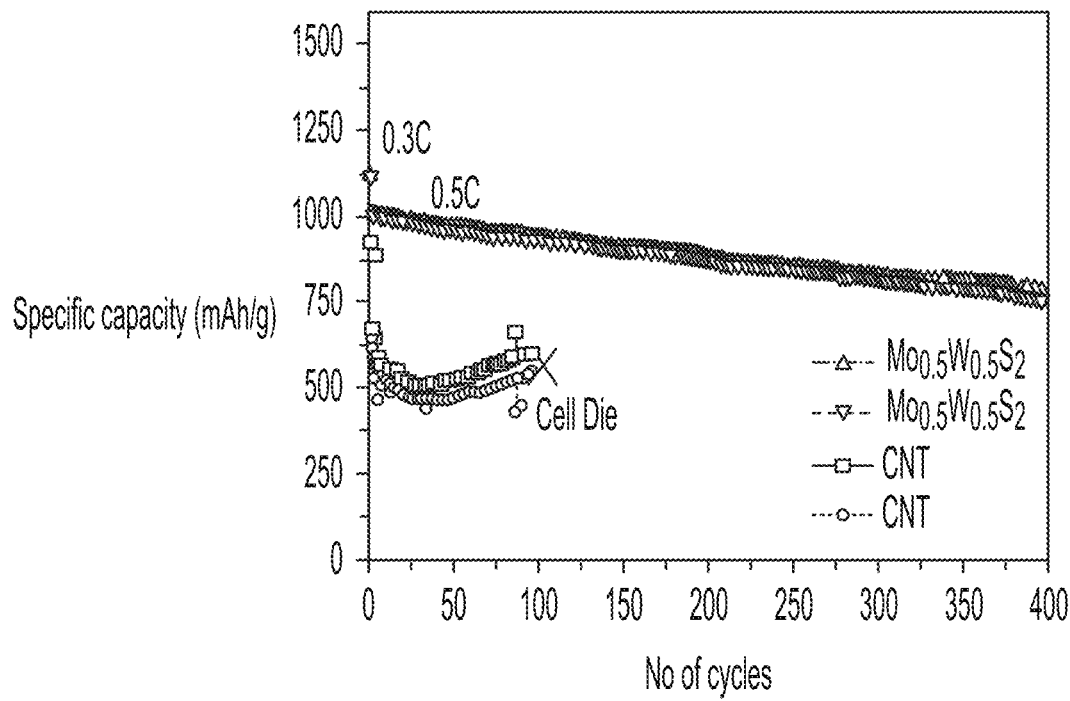

The durability of the experimental Li—S cells using the $Mo_{0.5}W_{0.5}S_2$ tested at 0.5 C showed stable battery performance for more than 400 cycles, and a specific capacity of approximately 750 mAh/g and coulombic efficiency >95% were maintained, as shown in FIG. 7D. However, the Li—S battery using a bare-CNT—S cathode tended to die after about 100 cycles. The $MoS_2$ and $WS_2$—CNT—S cathodes maintained their capacity without failure for 100 cycles; however, they exhibited lower specific capacity as compared to the $Mo_{0.5}W_{0.5}S_2$—CNT—S cathode. The $Mo_{0.5}W_{0.5}S_2$—CNT—S cathode showed higher reversible specific capacity as compared to the previously reported 2D catalyst systems in Li—S batteries. The $Mo_{0.5}W_{0.5}S_2$—CNT—S(0.5 C) showed much higher energy density and power density as compared to the bare-CNT—S cathode. Additionally, the observed energy density for the experimental implementation was higher than that of conventional Li-ion batteries and comparable to that of conventional Li—S batteries.

Figure 10A:
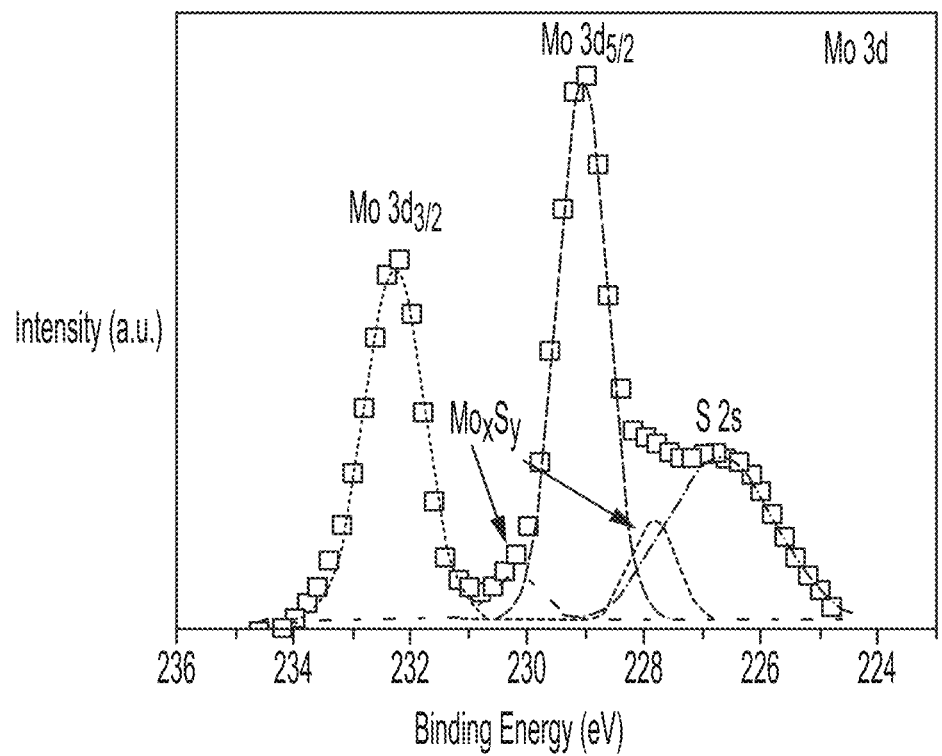
FIGS. 10A-10E illustrate testing measurements of an experimental implementation of the present application.
Figure 10B:
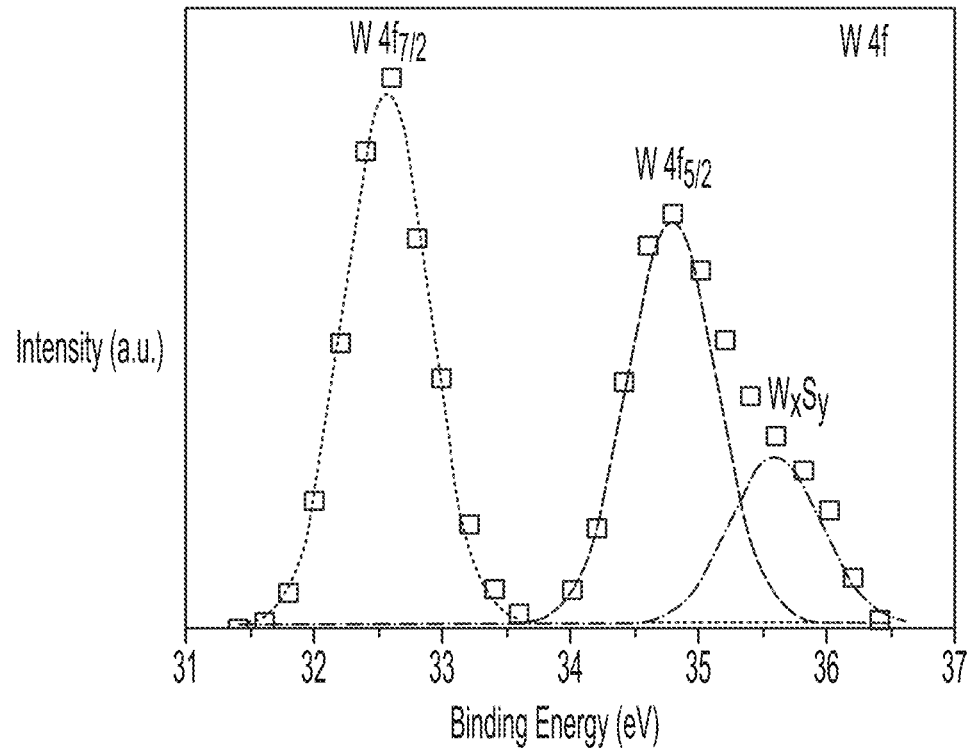

The elemental composition and chemical and electronic states of the elements bonded on the CNT paper were also analyzed using X-ray photoelectron spectroscopy (XPS) analysis. Referring FIGS. 10A-10D, FIG. 10A shows two major peaks of Mo 3d and S 2s spectra from the experimental $Mo_{0.5}W_{0.5}S_2$ catalyst deposited on CNT paper. The most intense binding energy was observed at 232.27 (Mo $3d_{3/2}$), 229.08 (Mo $3d_{5/2}$), and 226.70 eV (S 2s), corresponding to the $Mo_4^+$ state in $Mo_{0.5}W_{0.5}S_2$. These values correlate to the 2H-phase of $MoS_2$. A small amount of nonstoichiometric $Mo_xS_y$ with an intermediate oxidation state was also present and evidenced by the lower binding energy in the Mo 3d and S 2p spectra at 227.89 eV and 230.71 eV, respectively. This was due to the presence of surface defects induced during the two-step synthesis. These defect sites have shown to be a combination of metallic clusters of Mo and S vacancies corresponding to less sulfur atoms surrounding the Mo within the lattice exhibiting 1T-phase characteristics detailed in previous studies. FIG. 10B shows the most intense binding energy of W 4f peaks at 32.54 (W $4f_{7/2}$) and 34.79 eV (W $4f_{5/2}$), which correspond to its $W_4^+$ state in the 2H phase. Similar to Mo 3d peaks, a small amount of nonstoichiometric $W_xS_y$ with intermediate oxidation states was also observed. Because of the lower binding energy in the W 4f spectra at 35.65 eV, the observed results correlated with the induced sulfur deficiencies observed in the former case.

Figure 10C:
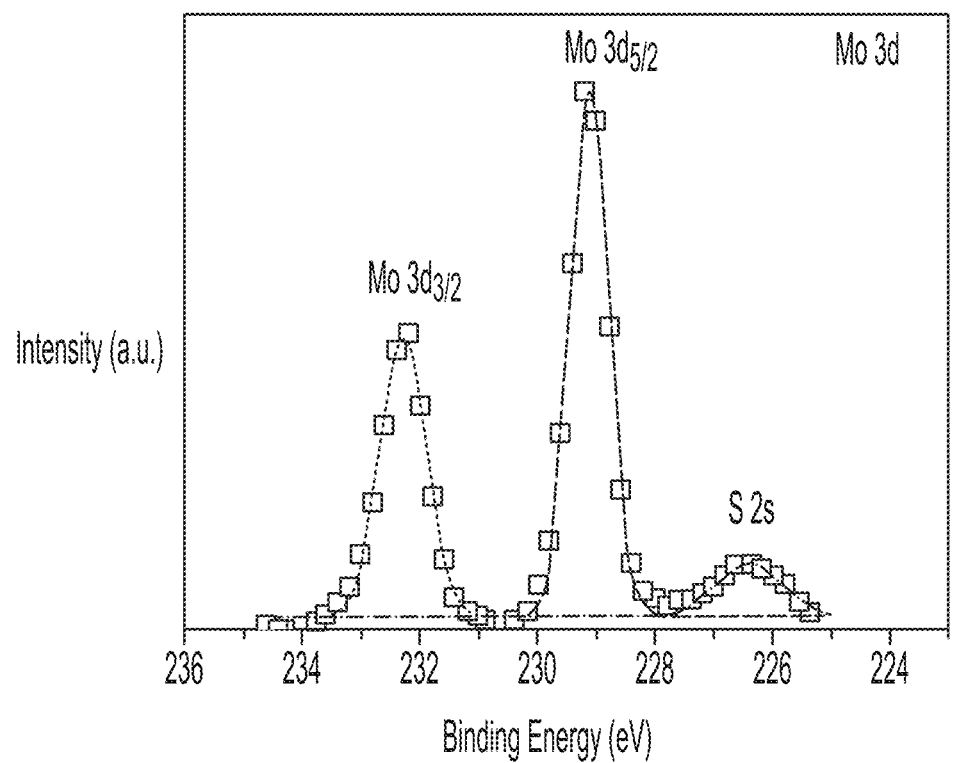
Figure 10D:
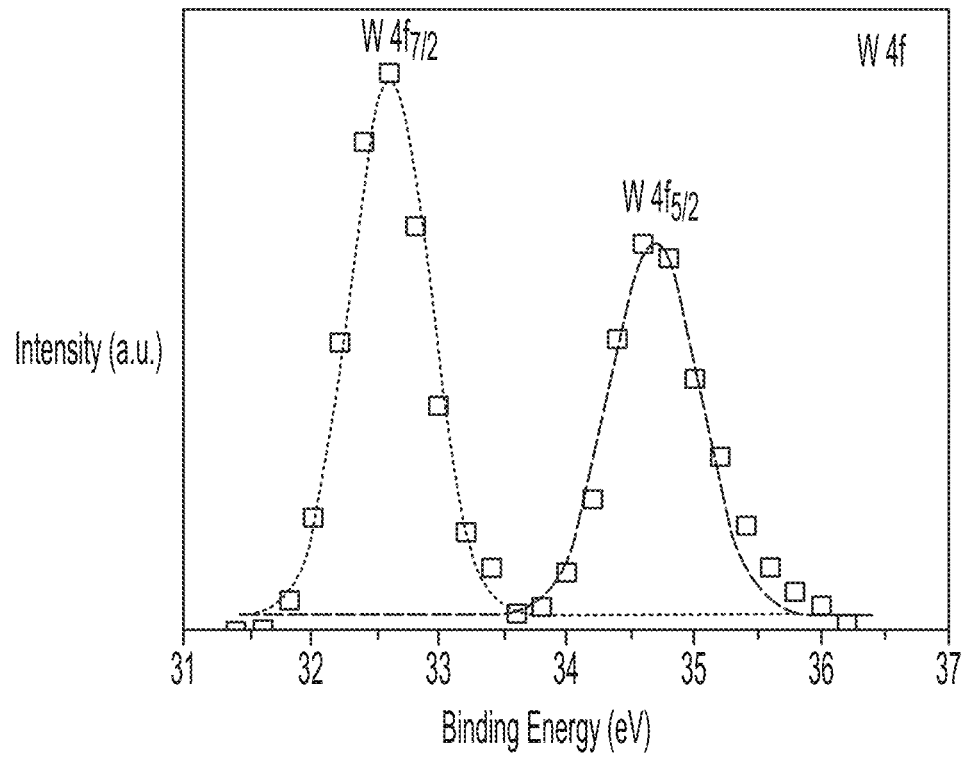

Likewise, there were two representative intense peak positions observed in the reference $MoS_2$ and $WS_2$ catalysts on CNT paper. For the $MoS_2$ reference catalyst, two intense peaks of Mo 3d were observed at 232.27 (Mo $3d_{3/2}$) and 229.16 eV (Mo $3d_{5/2}$), while one S 2s peak was observed at 226.38 eV (FIG. 10C). Additionally, the two most intense binding energies of W 4f peaks at 32.59 (W $4f_{7/2}$) and 34.67 eV (W $4f_{5/2}$) in $WS_2$ are shown in FIG. 10D. The S 2p peaks were observed around 162.0±0.1 ($S^2p_{3/2}$) and 163.3±0.2 eV ($S^2p_{5/2}$), which correspond to the $S_2^-$ state of sulfur in $MoS_2$, $WS_2$ and $Mo_{0.5}W_{0.5}S_2$. Unlike in the $MoS_2$ and $WS_2$ reference catalysts, noticeable intermediate oxidation states were observed in the $Mo_{0.5}W_{0.5}S_2$ catalyst. These existing intermediate oxidation states possess 6.4% and 7.7% of the total area in Mo 3d and W 4f peaks, respectively, which can be attributed to the increased sulfur defects, resulting in mixed 2H and 1T phase in the $Mo_{0.5}W_{0.5}S_2$ alloy. The mixed-phase characteristic behavior of the experimental $Mo_{0.5}W_{0.5}S_2$ alloy provides for synergistic behavior, resulting in higher catalytic activity as well as faster electron transfer during LiPSs conversion reaction.

Figure 10E:
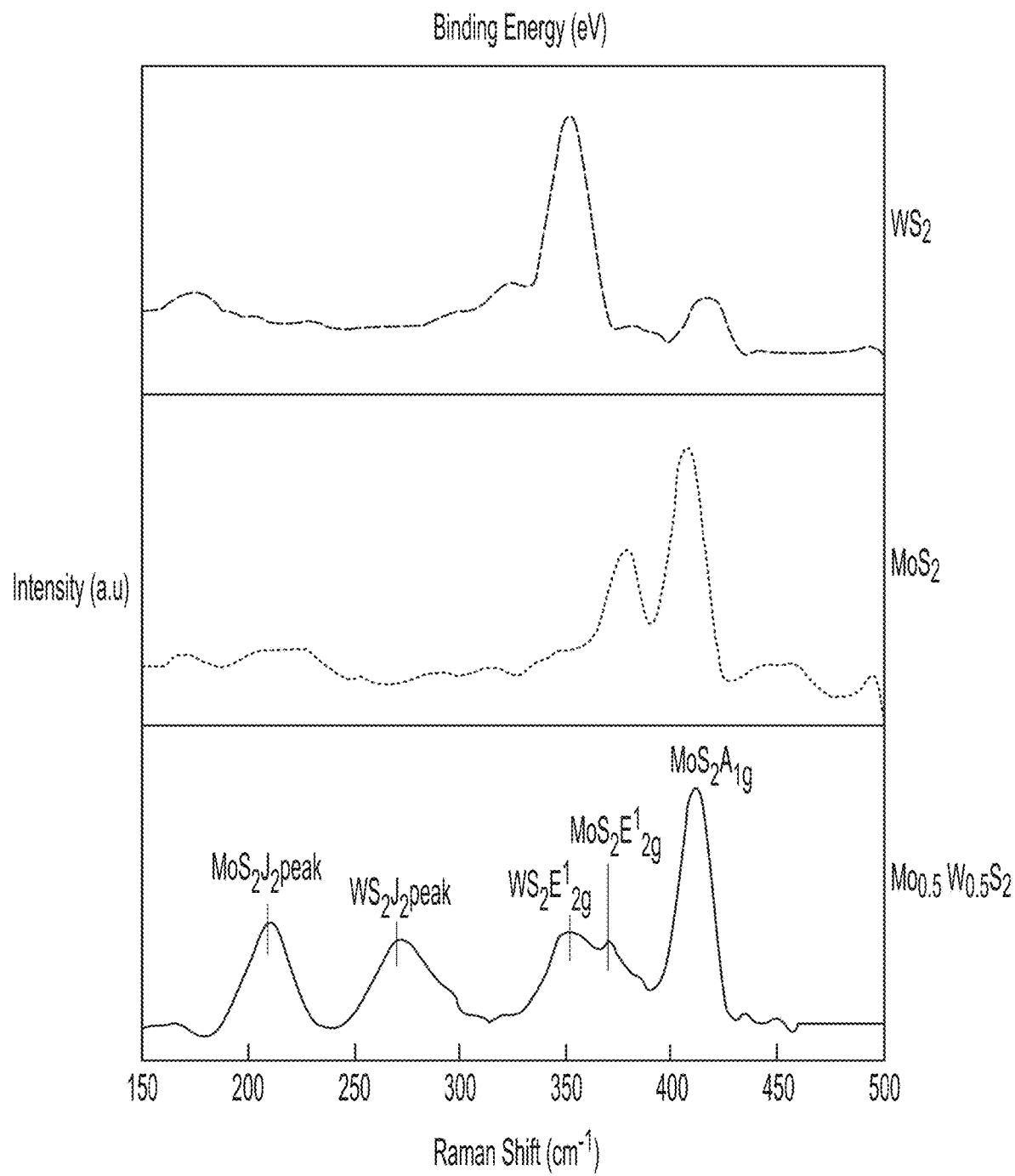

These results were further confirmed using Raman analysis to examine the structure of the experimental $Mo_{0.5}W_{0.5}S_2$ alloy fabricated according to implementations discussed herein. The $MoS_2$ peaks at 378.1 and 408.2 $cm^{-1}$ in FIG. 10E correspond to in-plane $E^1{}_{2g}$ (Γ) and out-of-plane $A_{1g}$ (Γ) phonon modes, respectively. These peaks represent the 2H-phase of $MoS_2$. Upon alloying with W, the $A_{1g}$ (Γ) peak showed a shift toward higher energy (410.6 $cm^{-1}$), and an extra peak corresponding to $WS_2$ was introduced near 350.3 $cm^{-1}$; no major shift was observed for the $E_{2g}{}^1$ (Γ) peak. As compared with pristine TMD samples (e.g., $MoS_2$ and $WS_2$ on CNT paper), additional peaks with a lower intensity were observed near 209.8 and 271.3 $cm^{-1}$ corresponding to the peaks of 1T phase-$MoS_2$ and $J_2$ phase-$WS_2$, respectively.

Figure 11A:
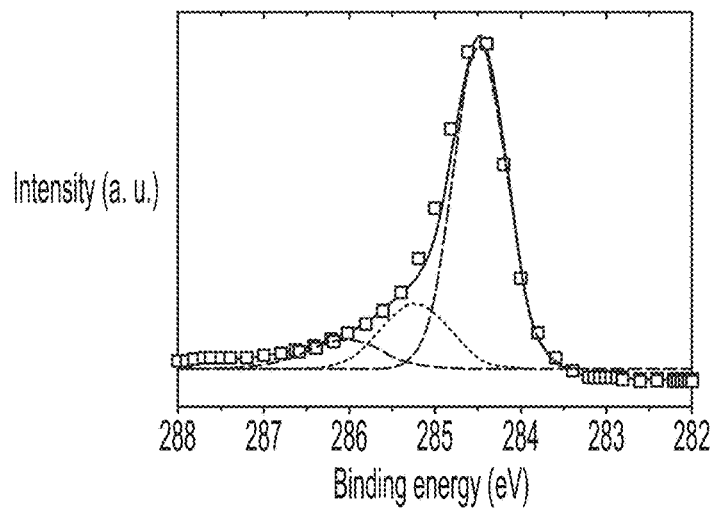
FIGS. 11A-11C illustrate testing measurements of an experimental implementation of the present application.
Figure 11B:
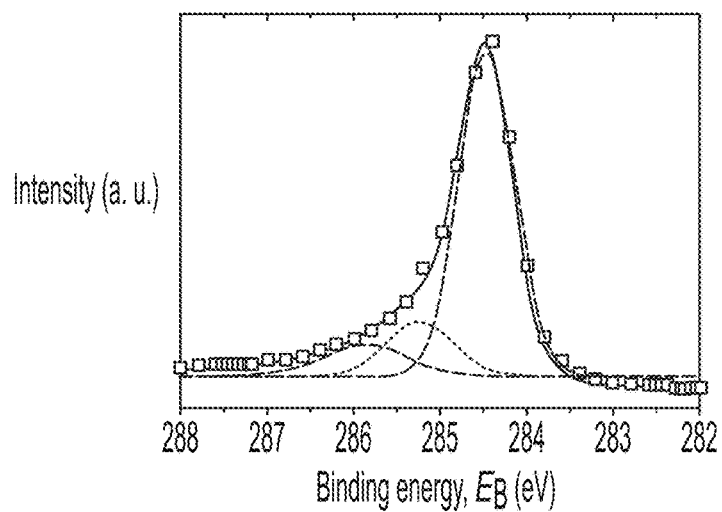
Figure 11C:
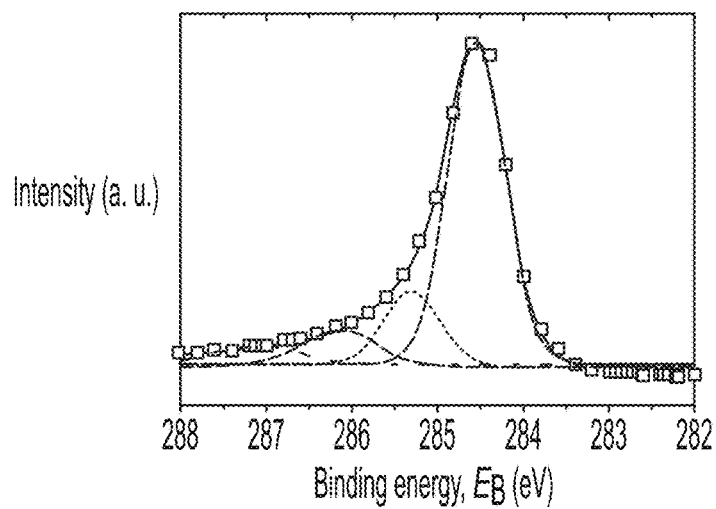

Referring to FIGS. 11A-11C, comparative C is spectra for the $MoS_2$ (FIG. 11A) and $WS_2$ (FIG. 11B) reference samples and the experimental $Mo_{0.5}W_{0.5}S_2$ (FIG. 11C) catalyst, each on CNT paper, are illustrated. The most intense C is peaks for all synthesized catalysts were observed commonly at 284.54 (C—C), 285.36 (C—S), 286.14 eV (C—O), and 287.45 eV (C=O). Notably, the formation of the C—S bond between the interface of the CNT and the catalysts plays a vital role in enhancing the electronic coupling and forming a stable structure, thereby improving the electron transfer from CNT to $Mo_{0.5}W_{0.5}S_2$. This behavior can greatly enhance the electrochemical performance of an Li—S battery.

Figure 12A:
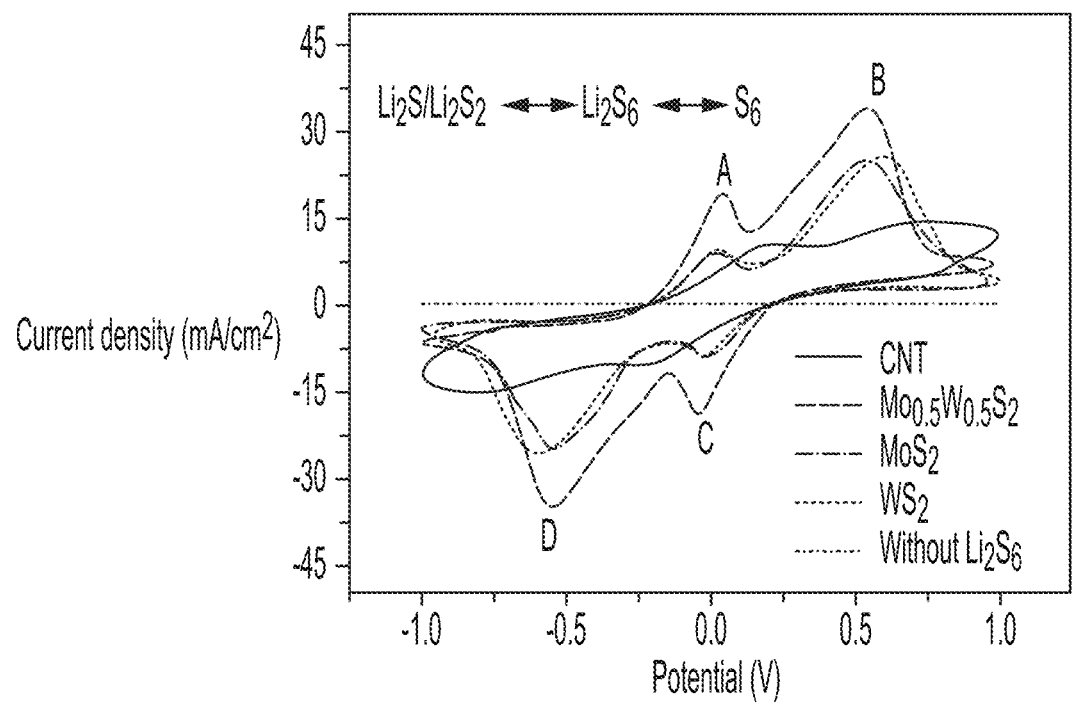
FIGS. 12A-12B illustrate testing measurements of an experimental implementation of the present application.
Figure 12B:
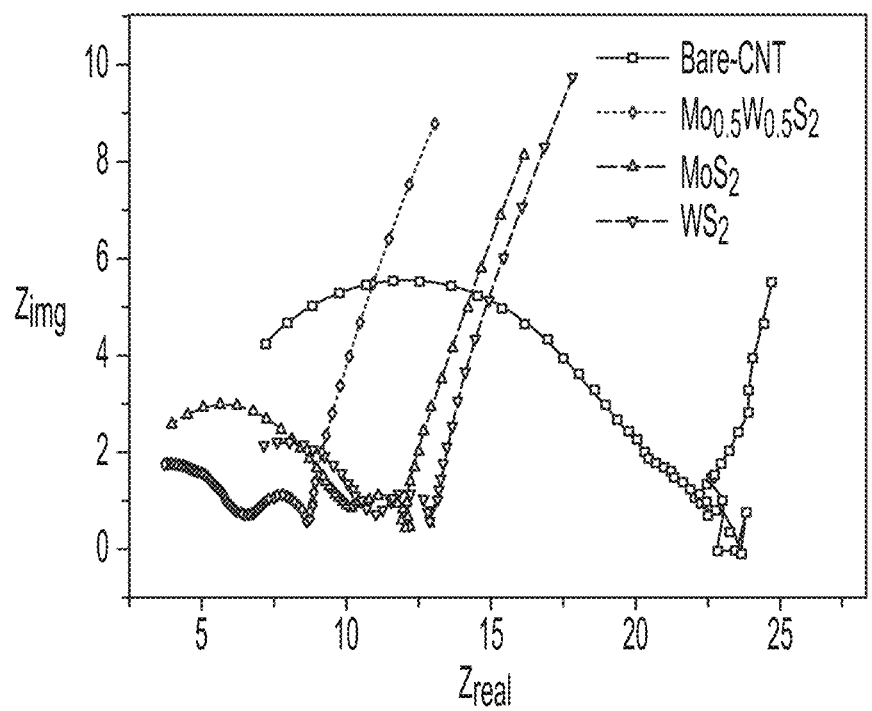

Referring to FIGS. 12A-12B, the electrocatalytic performance of an experimental implementation of $Mo_{0.5}W_{0.5}S_2$ alloy on polysulfide redox reactions was also examined using a symmetrical cell test employing $MoS_2$, $WS_2$, and $Mo_{0.5}W_{0.5}S_2$ coated on CNT paper as the working and counter electrodes in the 0.2 M $Li_2S_6$ electrolyte. The redox behavior of as-synthesized catalysts for lithium polysulfide conversion was analyzed using CV tests. The $MoS_2^-$ and $WS_2$-coated CNT paper and bare CNT paper were used as the reference for comparing the catalytic performance of the $Mo_{0.5}W_{0.5}S_2$ alloy-coated CNT paper. As shown in FIG. 12A, the CV curves for the experimental $Mo_{0.5}W_{0.5}S_2$ alloy show four distinct high intensity peaks at −0.035 V, −0.527 V, 0.035 V, and 0.527 V. Because the only active species in the experimental electrolyte contained $Li_2S_6$, the observed peaks in CV curves can be correlated to the oxidation and reduction of $Li_2S_6$ on the surface of the working electrode (WE). The peaks at A and B of FIG. 12A correspond to the oxidation of $Li_2S/Li_2S_2$ to $Li_2S_6$ and $Li_2S_6$ to $S_8$, respectively, and the C and D peaks of FIG. 12A correspond to the reduction of $S_8$ to $Li_2S_6$ and $Li_2S_6$ back to $Li_2S/Li_2S_2$, respectively. During oxidation of $Li_2S$ on the WE, there was a simultaneous reduction of $S_8$ to $Li_2S_6$ on the counter electrode. Accordingly, the experimental 2D TMD alloy (e.g., $Mo_{0.5}W_{0.5}S_2$) showed superior catalytic performance even at higher scan rates as compared to other electrodes. Likewise, the redox peak currents exhibited a linear correlation to the square root of the scan rate.

The Li-ion diffusion coefficient for the experimental 2D TMD alloy was calculated using classical Randles-Sevcik equation:

$$I_p = 2.69 \times 10^5 n^{1.5} A D_{Li+}^{0.5} C V^{0.5} C_{Li}$$

The calculated Li-ion diffusion coefficients for the experimental implementations were $D_{Li+}^{Bare\ CNT} = 1.5 \times 10{-9}\ cm^2/s$; $D_{Li+}^{MoS2} = 3.78 \times 10{-9}\ cm^2/s$; $D_{Li+}^{WS2} = 5.5 \times 10{-9}\ cm^2/s$; and $D_{Li+}^{Mo0.5W0.5S2} = 1.2 \times 10{-8}\ cm2/s$. This behavior can be correlated to the overall series resistance of the synthesized 2D catalytic electrodes, as summarized in FIG. 12B. The higher diffusion coefficient of the Li-ion in $Mo_{0.5}W_{0.5}S_2$—CNT paper resulted in the lowest charge-transfer resistance as compared to other electrodes. Accordingly, the $Mo_{0.5}W_{0.5}S_2$—CNT paper showed higher redox peaks for $Li_2S_6$ conversion. The polysulfide absorption capability of the $Mo_{0.5}W_{0.5}S_2$—CNT paper was further analyzed by dropping the electrode in 2 mmol $Li_2S_6$ solution. The resulting $Mo_{0.5}W_{0.5}S_2$—CNT solution was clearer than that of bare-CNT-paper, and agglomerates of $Li_2S_6$ were observed on the surface of $Mo_{0.5}W_{0.5}S_2$—CNT paper, suggesting a higher polysulfide reduction capacity for synthesized 2D $MoWS_2$ catalyst.

Figure 13:
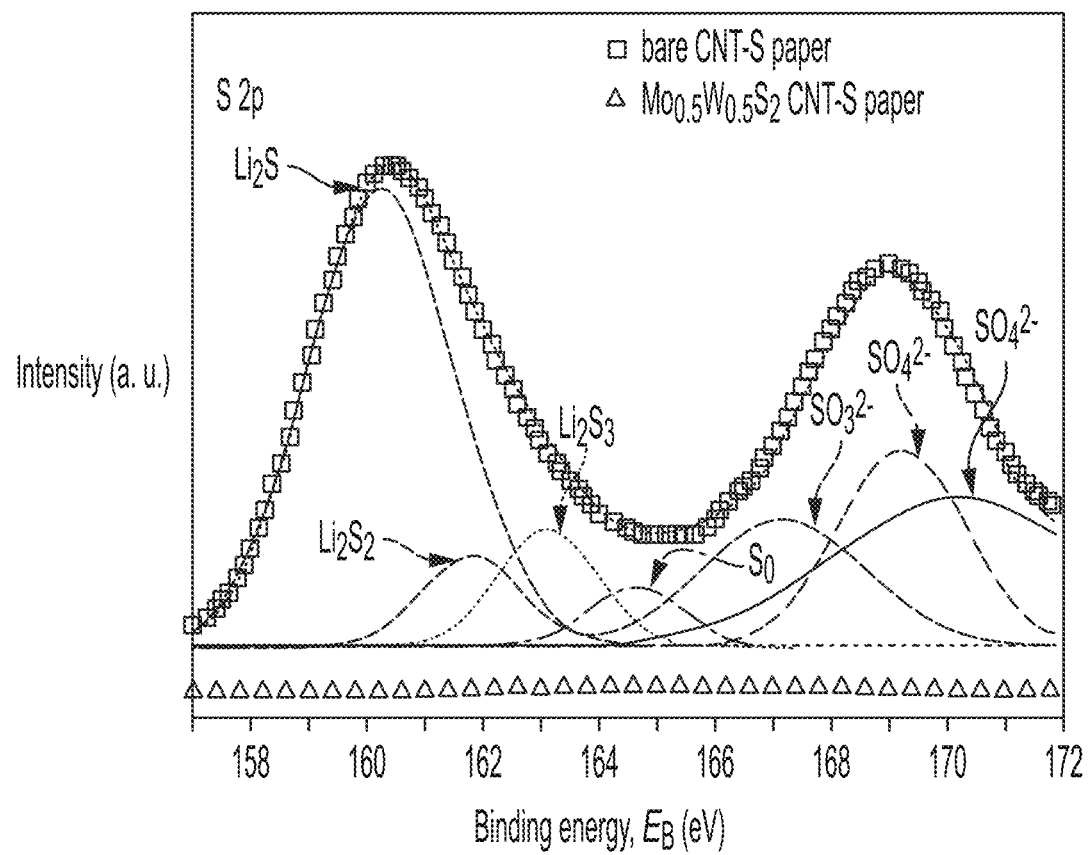
FIG. 13 illustrates testing measurements of an experimental implementation of the present application.

Additionally, post-characterization of the experimental Li—S cells was performed after the long-term stability test where the cells were disassembled to analyze the effect of the polysulfide shuttle and its interaction with the electrodes. The Li anode with bare-CNT—S cathode cell formed a thick porous layer of polysulfides, resulting in battery failure after 100 cycles. However, such behavior was absent in cells fabricated using $Mo_{0.5}W_{0.5}S_2$—CNT—S cathodes. The surfaces of both the Li anodes were analyzed in detail using XPS spectroscopy. The comparison of S 2p peaks for both the anodes indicating the formation of lithium polysulfide is depicted in FIG. 13. The two most intense peaks of S 2p at 160.23 and 169.07 eV and inner peaks at 160.23 ($Li_2S$), 161.73 ($Li_2S_2$), 163.14 ($Li_2S_3$), 164.53 ($S_8$), 167.14 ($SO_3^{2-}$), 169.21, and 170.28 eV ($SO_4^{2-}$) were observed. The two $SO_4^{2-}$ peaks at 169.21 and 170.28 eV could be attributed to lithium thiosulfate ($Li_2S_2O_3$). This oxidized sulfur peak was formed as a result of oxidation reaction followed by the reduction of $LiNO_3$ used as an additive in the electrolyte. The thiosulfate was a byproduct of a disproportionation reaction between sulfite and polysulfide; therefore, the most intense binding energies of S 2s peaks were only observed in the bare-CNT—S cathode. However, almost negligible or no S 2p peaks were observed for the Li anodes containing a $Mo_{0.5}W_{0.5}S_2$—CNT—S.

Although aspects of the present application and its advantages have been described in detail, it should be understood that various changes, substitutions and alterations can be made herein without departing from the spirit and scope as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps. Moreover, the scope of the present application is not intended to be limited to the particular implementations of the process, machine, manufacture, composition of matter, means, methods and steps described in the specification.

The invention claimed is:

1. A method comprising:
    forming a catalyst by:
        providing a carbon material;
        providing one or more metal sources for one or more metals;
        sputtering the one or more metals onto the carbon material to form a top layer on the carbon material, wherein composition of the top layer varies based on deposition power and deposition time;
        transferring the carbon material having the top layer to a chemical vapor deposition (CVD) chamber; and
        sulfurizing the top layer to form a two-dimensional (2D) transition metal dichalcogenides (TMD) layer.

2. The method of claim 1, further comprising creating one or more sulfur vacancy defects in the catalyst by sulfur etching the 2D TMD layer.

3. The method of claim 2, wherein the sulfur etching is performed at a pressure between $10^{-1}$ and $10^{-3}$ Torr and at an annealing temperature between 200 and 600° C.

4. The method of claim 2, wherein performing the sulfur etching comprises applying a solvent to etch chalcogenides atoms from the 2D TMD layer.

5. The method of claim 1, wherein the top layer is sulfurized at a temperature between 200 and 800° C.

6. The method of claim 1, wherein the carbon material comprises graphite, activated carbon, carbon nanotubes, or porous carbon structures.

7. The method of claim 1, wherein the one or more metals are simultaneously sputtered: onto the carbon material using Argon (Ar) plasma, at a temperature between room temperature and 5000 C, or both.

8. The method of claim 1, wherein a deposition power of the sputtering is between 5 and 50 W and a deposition time of the sputtering is between 1 and 1,000 seconds.

9. The method of claim 1, wherein the one or more metal sources comprise a first metal source for a first metal and a second metal source for a second metal, wherein sputtering the one or more metals comprises simultaneously sputtering the first metal and the second metal onto the carbon material, wherein the top layer comprises an alloy top layer, and wherein the 2D TMD layer comprises a 2D TMD alloy layer.

10. The method of claim 9, wherein a composition of the alloy top layer corresponds to a ratio between a first deposition power corresponding to the first metal and a second deposition power corresponding to the second metal.

11. The method of claim 9, wherein the first and second metals are selected from a group consisting of Si, Ge, Sn, Pb, Sb, Al, Ti, Ta, Mo, W, Hf, Ni, Nb, Co, and Cd.

12. The method of claim 9, wherein the 2D TMD alloy layer comprises sulfides, phosphides, selenides, tellurides of Si, Ge, Sn, Pb, Sb, Al, Ti, Ta, Mo, W, Hf, Ni, Nb, Co, Cd, or composites thereof.

13. The method of claim 9, wherein the 2D TMD is stoichiometric.

14. The method of claim 9, wherein the 2D TMD is non-stoichiometric.

15. The method of claim 1, wherein a particle size of the catalyst is between 1 nm and 10 μm, wherein particles of the catalyst are bonded with the carbon material, and wherein a particle amount of the catalyst is at least 1% by weight.

16. The method of claim 1 further comprising:
hot-pressing, at temperatures between 100 and 300° C., sulfur powder on the 2D TMD layer, wherein a weight of the carbon material is 1-10 mg/cm$^2$ and a weight of the sulfur powder is 1-10 mg/cm$^2$.

* * * * *

UNITED STATES PATENT AND TRADEMARK OFFICE
CERTIFICATE OF CORRECTION

PATENT NO. : 11,652,206 B2
APPLICATION NO. : 17/219523
DATED : May 16, 2023
INVENTOR(S) : Wonbong Choi It is certified that error appears in the above-identified patent and that said Letters Patent is hereby corrected as shown below:

In the Specification

At Column 3, Line number 9, delete "TMID" and replace with --TMD--.
At Column 12, Line number 11, delete "120 m" and replace with --120 μm--.
At Column 14, Line number 2, delete "162.0 + 0.1" and replace with --162.0 ± 0.1--.
At Column 14, Line number 2, delete "163.3 + 0.2" and replace with --163.3 ± 0.2--.
At Column 14, Line number 30, delete "C is" and replace with --C 1s--.
At Column 14, Line number 33, delete "C is" and replace with --C 1s--.

Signed and Sealed this
Twenty-sixth Day of March, 2024

Katherine Kelly Vidal
*Director of the United States Patent and Trademark Office*